(12) United States Patent
Domyo et al.

(10) Patent No.: US 7,740,227 B2
(45) Date of Patent: Jun. 22, 2010

(54) JOINT

(75) Inventors: Nobuo Domyo, Sakai (JP); Hajime Kurata, Sakai (JP); Shogo Ota, Sakai (JP)

(73) Assignee: Daikin Industries, Ltd., Osaka (JP)

(*) Notice: Subject to any disclaimer, the term of this patent is extended or adjusted under 35 U.S.C. 154(b) by 1111 days.

(21) Appl. No.: 10/575,094

(22) PCT Filed: Apr. 6, 2005

(86) PCT No.: PCT/JP2005/006754

§ 371 (c)(1),
(2), (4) Date: Apr. 7, 2006

(87) PCT Pub. No.: WO2005/100838

PCT Pub. Date: Oct. 27, 2005

(65) Prior Publication Data

US 2009/0041533 A1 Feb. 12, 2009

(30) Foreign Application Priority Data

Apr. 15, 2004 (JP) ............................. 2004-120548

(51) Int. Cl.
*F16K 51/00* (2006.01)
*F16L 29/00* (2006.01)
*F16L 37/28* (2006.01)

(52) U.S. Cl. ................................. 251/149.6; 251/149.3

(58) Field of Classification Search ............... 251/149.1, 251/149.3, 149.6
See application file for complete search history.

(56) References Cited

U.S. PATENT DOCUMENTS

| | | | | |
|---|---|---|---|---|
| 3,339,883 A | * | 9/1967 | Drake ..................... | 251/149.4 |
| 3,490,473 A | * | 1/1970 | Weiner et al. ............. | 137/74 |
| 3,556,470 A | * | 1/1971 | Ehrens et al. ............. | 251/149.4 |
| 4,017,057 A | * | 4/1977 | Strybel .................... | 251/149.1 |
| 4,540,205 A | | 9/1985 | Watanabe et al. | |
| 4,672,993 A | * | 6/1987 | Bilak ........................ | 137/322 |
| 5,738,335 A | * | 4/1998 | Coutu ...................... | 251/149.4 |
| 5,984,267 A | * | 11/1999 | Coutu ...................... | 251/149.4 |
| 6,113,157 A | * | 9/2000 | Wilkins .................... | 285/263 |

FOREIGN PATENT DOCUMENTS

| | | |
|---|---|---|
| CN | 2190729 Y | 3/1995 |
| CN | 2307979 Y | 2/1999 |
| JP | 49-41543 U | 11/1974 |
| JP | 63-164689 U | 10/1988 |
| JP | 02-48694 U | 4/1990 |
| JP | 05-90078 U | 12/1993 |
| JP | 2002-276866 A | 9/2002 |

* cited by examiner

*Primary Examiner*—John K Fristoe, Jr.
(74) *Attorney, Agent, or Firm*—Global IP Counselors

(57) ABSTRACT

A joint for bringing into communication a first fluid passageway and a second fluid passageway of a nut member includes a push rod and a main body. The main body forms a push rod storage space, a communication path, a seal structure forming part and a male thread part. The push rod storage space houses the push rod so that one part of the push rod protrudes along a push rod longitudinal direction. The seal structure forming part is capable of forming a seal structure by contacting a first tapered part of the nut member. The male thread part is capable of screwing together with a female thread part of the nut member such that the seal structure forming part contacts the first tapered part. The part of the portion of the push rod contacts one part of the nut member.

20 Claims, 21 Drawing Sheets

JOINT

CROSS-REFERENCE TO RELATED APPLICATIONS

This U.S. National stage application claims priority under 35 U.S.C. §119(a) to Japanese Patent Application No. 2004-120548, filed in Japan on Apr. 15, 2004 the entire contents of which are hereby incorporated herein by reference.

TECHNICAL FIELD

The present invention relates to a joint for connecting a pressure sensor, a flared copper pipe, and the like, to another piping.

BACKGROUND ART

Members called joints are often used to connect pressure sensors, flared copper pipes, and the like, to another piping and the like.

Incidentally, among such joints, a joint of which the connection portion can be sealed by deforming a metal gasket, such as a copper gasket is well known among persons skilled in the art (for example, refer to Japanese Patent Publication No. 2002-276866).

FIG. 1(a) depicts a representative example of such a joint. The joint 10 comprises a push rod 12, a main body 11, a steel ball 15, a spring 16, a copper gasket 13, and a copper pipe part 17, as depicted in FIG. 1(a).

The push rod 12 comprises a contact part 12a, a first passageway Pc11, and a second passageway Pc12. The contact part 12a is provided at one end part in the push rod longitudinal direction X. In addition, this contact part 12a is provided with a contact tapered part 12b. Furthermore, as is clear from FIG. 1(a), this contact tapered part 12b is provided at an end part of the contact part 12a on a push rod protruding side X1 in the push rod longitudinal direction X so that it surrounds the first passageway Pc11. In addition, the contact tapered part 12b is inclined toward the outer circumference and toward the opposite side X2 of the push rod protruding side in the push rod longitudinal direction X. Furthermore, when a male thread part 14 and a female thread part 22 of a pressure sensor connecting nut 20 depicted in FIG. 1(b) are screwed together in a state wherein the push rod 12 is housed in a push rod storage space SPc of the main body 11 which is discussed later, then the tapered part 12b contacts a nut tapered part 21 of the pressure sensor connecting nut 20 (refer to FIG. 1(b) and FIG. 1(c)). In addition, the end part of the push rod 12 on the opposite side X2 of the push rod protruding side in the push rod longitudinal direction X contacts the steel ball 15. Furthermore, the push rod 12 and the steel ball 15 are urged toward the push rod protruding side X1 in the push rod longitudinal direction X by a spring 16. Namely, when an external force is applied from the opposite side X2 of the push rod protruding side in the push rod longitudinal direction X, the push rod 12 is capable of moving along the push rod longitudinal direction X toward the opposite side X2 of the push rod protruding side. The first passageway Pc11 is formed along the push rod longitudinal direction X. In addition, the second passageway Pc12 is formed along a direction perpendicular to the push rod longitudinal direction X. Furthermore, the first passageway Pc11 and the second passageway Pc12 are in communication and form a first transit path Pc1.

The main body 11 comprises the push rod storage space SPc, the male thread part 14, and a second transit path Pc2. The push rod 12 is housed in the push rod storage space SPc so that the contact part 12a of the push rod 12 protrudes externally. Furthermore, the push rod storage space SPc, in a state wherein the push rod 12 is so housed, is in communication with the first transit path Pc1. The male thread part 14 is provided so that it surrounds the outer circumference of the push rod storage space SPc. Furthermore, the male thread part 14 is capable of screwing together with the female thread part 22 of the pressure sensor connecting nut 20 along the push rod longitudinal direction X (refer to FIG. 1(b)). The fluid that comes flowing from a fluid passageway of a copper piping (not shown) which is to be connected, flows to the second transit path Pc2.

The steel ball 15 is disposed in the second transit path Pc2 and urged by the spring 16, thereby separating between the push rod storage space SPc and the second transit path Pc2.

The spring 16 is disposed in the second transit path Pc2, the same as the steel ball 15, and urges the push rod 12 and the steel ball 15, as discussed above.

The copper gasket 13 is disposed in the space interposed between the surface of the contact part 12a on the opposite side X2 of the push rod protruding side in the push rod longitudinal direction X and the surface of the main body 11 on the push rod protruding side X1 in the push rod longitudinal direction X.

The copper pipe part 17 comprises a third transit path Pc3 and is connected to the lower end of the main body 11 by a solder 18. Furthermore, the lower end of the copper pipe part 17 is connected to the copper piping (not shown) by braising beforehand so that the passageway of the copper piping (not shown) to be connected and the third transit path Pc3 of the copper pipe part 17 are in communication.

Furthermore, to screw together the male thread part 14 of the joint 10 and the female thread part 22 of the pressure sensor connecting nut 20, the contact tapered part 12b first comes into contact with the nut tapered part 21 of the pressure sensor connecting nut 20, and the push rod 12 and the steel ball 15 then begin to move against the spring force of the spring 16 toward the opposite side X2 of the push rod protruding side in the push rod longitudinal direction X. As a result, a passageway Pp of the pressure sensor connecting nut 20 and a first transit path Pc1 of the push rod 12 communicate; additionally, the push rod storage space SPc and the second transit path Pc2 also communicate (refer to FIG.(c)). Furthermore, as the screwing together progresses, the copper gasket 13, which is deformed by being compressed by the surface of the contact part 12a on the opposite side X2 of the push rod protruding side in the push rod longitudinal direction X and the surface of the main body 11 on the push rod protruding side X1 in the push rod longitudinal direction X, seals the gap between the contact part 12a and the main body 11. In this state, the contact tapered part 12b and the nut tapered part 21 of the pressure sensor connecting nut 20 are sufficiently crimped, thereby sufficiently sealing the contact part 12a and the pressure sensor connecting nut 20.

In addition, the joint 10 is capable, in cooperation with a flared copper pipe connecting nut 40 depicted in FIG. 1(e), of connecting a flared copper pipe 30 depicted in FIG. 1(d) with another copper piping (not shown). Furthermore, the second transit path Pc2 of the joint 10 is connected to the fluid passageway of another copper piping (not shown) by braising, the same as in the case of the pressure sensor connecting nut 20. In addition, to connect the flared copper pipe 30 to the joint 10, the flared copper pipe 30 is inserted in advance into an opening HL of the flared copper pipe connecting nut 40 as depicted in FIG. 1(f). Furthermore, although a flared part 31 of the flared copper pipe 30 and a nut tapered part 41 of the flared copper pipe connecting nut 40 appear to be tightly sealed in FIG. 1(f), the flared part 31 of the flared copper pipe 30 and the nut tapered part 41 of the flared copper pipe connecting nut 40 are not necessarily tightly sealed in this state.

Furthermore, continuing with screwing together the male thread part 14 of the joint 10 and a female thread part 42 of the flared copper pipe connecting nut 40, the contact tapered part 12b first makes contact with the flared part 31 of the flared copper pipe 30, and then the push rod 12 and the steel ball 15 begin to move against the spring force of the spring 16 toward the opposite side X2 of the push rod protruding side in the push rod longitudinal direction X. As a result, a passageway Pf of the flared copper pipe 30 and a first transit path Pc1 of the push rod 12 communicate, and the push rod storage space SPc and the second transit path Pc2 also communicate (refer to FIG. 1(g)). Furthermore, as the screwing together progresses, the copper gasket 13, which is deformed by being compressed by the surface of the contact part 12a on the opposite side X2 of the push rod protruding side in the push rod longitudinal direction X and the surface of the main body 11 on the push rod protruding side X1 in the push rod longitudinal direction X, seals the gap between the contact part 12a and the main body 11. Furthermore, in this state, the flared part 31 of the flared copper pipe 30 is sufficiently pressed interposingly between the contact tapered part 12b and the nut tapered part 41 of the flared copper pipe connecting nut 40, thereby sufficiently sealing the flared part 31, the contact part 12a, and the flared copper pipe connecting nut 40.

SUMMARY OF THE INVENTION

Incidentally, when the angles β, γ formed by inclination directions Sp, Sf of the nut tapered parts 21, 41 of the pressure sensor connecting nut 20 or the flared copper pipe connecting nut 40 with the push rod longitudinal direction X is smaller than an angle a formed by an inclination direction Sc1 of the contact tapered part 12b with the push rod longitudinal direction X, then there is a problem in that, as the screwing together progresses to the point where the copper gasket 13 is deformed, the pressure sensor connecting nut 20, the flared copper pipe connecting nut 40, deform, and, in the worst case, completely crack (refer to FIG. 1(a), FIG. 1(b), and FIG.(e)).

It is an object of the present invention to provide a joint that can prevent the cracking of the pressure sensor connecting nut, the flared copper pipe connecting nut, and the like.

A joint according to a first aspect of the present invention is a joint for bringing into communication: a first fluid passageway; and a second fluid passageway of a nut member which comprises the second fluid passageway, a female thread part, and a first tapered part; and comprising a push rod and a main body. Furthermore, a fluid passes through the first fluid passageway. In addition, the first tapered part is inclined toward the outer circumferential side and toward the female thread part side. The main body comprises a push rod storage space, a communication path, a seal structure forming part, and a male thread part. The push rod storage space houses the push rod so that one part of the push rod protrudes along a push rod longitudinal direction. The communication path is a passageway for communicating with the first fluid passageway. Furthermore, this communication path is provided in the main body on an opposite side of a push rod protruding side of the push rod storage space in the push rod longitudinal direction. The seal structure forming part is provided at an end part of the main body on a push rod protruding side in the push rod longitudinal direction so that it surrounds the outer circumference of the push rod storage space. Furthermore, this seal structure forming part is capable of forming a seal structure by contacting the first tapered part. The male thread part is capable of screwing together with the female thread part along the push rod longitudinal direction. Furthermore, when the female thread part and the male thread part are screwed together, then the seal structure forming part contacts the first tapered part. In addition, one part of the portion of the push rod protruding from the push rod storage space contacts one part of the nut member, the push rod moves toward the opposite side of the push rod protruding side along the push rod longitudinal direction, and brings into communication the second fluid passageway and the communication path.

Here, the seal structure forming part contacts the first tapered part when the female thread part and the male thread part are screwed together. Consequently, with this joint, the main body and the nut member can be sealed by the seal structure forming part of the main body and the first tapered part of the nut member, without advancing the screwing together until the copper gasket deforms, as in a conventional joint. Accordingly, with this joint, the main body and the nut member can be sealed with a low tightening torque. As a result, with this joint, cracking of the nut member can be prevented. In addition, with this joint, the same as with a conventional joint, one part of the portion of the push rod protruding from the push rod storage space contacts one part of the nut member, the push rod moves toward the opposite side of the push rod protruding side along the push rod longitudinal direction, and brings into communication the second fluid passageway and the communication path. Consequently, with this joint as well, if the communication path and the first fluid passageway are brought into communication by a technique such as braising prior to screwing together the female thread part and the male thread part, then the fluid flowing to one fluid passageway can flow to another fluid passageway, the same as with a conventional joint.

A joint according to a second aspect of the present invention is a joint according to the first aspect of the present invention, wherein the seal structure forming part is a second tapered part. The second tapered part is inclined toward the outer circumferential side and toward the opposite side of the push rod protruding side in the push rod longitudinal direction.

Here, the seal structure forming part is the second tapered part. Consequently, with this joint, the seal structure forming part is capable of forming the seal structure by surface contact with the first tapered part. Accordingly, with this joint, it is possible to form a satisfactory seal structure.

A joint according to a third aspect of the present invention is a joint according to the second aspect of the present invention, wherein an angle formed by an inclination direction of the second tapered part with the push rod longitudinal direction is less than or equal to an angle formed by an inclination direction of the first tapered part with the push rod longitudinal direction in a state wherein the female thread part and the male thread part are screwed together.

Here, the angle formed by the inclination direction of the second tapered part with the push rod longitudinal direction is less than or equal to the angle formed by the inclination direction of the first tapered part with the push rod longitudinal direction in a state wherein the female thread part and the male thread part are screwed together. Consequently, with this joint, when the female thread part and the male thread part are screwed together, then the entire surface of the second tapered part can contact the entire surface of the first tapered part, or the push rod protruding side of the second tapered part in the push rod longitudinal direction can contact the push rod protruding side of the first tapered part in the push rod longitudinal direction. Accordingly, with this joint, a satisfactory seal state between the main body and the nut member can be achieved.

A joint according to a fourth aspect of the present invention is a joint according to the second aspect of the present invention or the third aspect of the present invention, wherein the second tapered part is provided with a first projection part. The first projection part projects toward the outer circumferential side. Furthermore, the first projection part forms a seal structure by contacting the first tapered part and deforming.

Here, the second tapered part is provided with the first projection part. Furthermore, the first projection part forms a seal structure by contacting the first tapered part and deforming. Consequently, with this joint, it is possible to form a rigid seal structure.

A joint according to a fifth aspect of the present invention is a joint according to the first aspect of the present invention, wherein the seal structure forming part is a convex spherical surface part.

Here, the seal structure forming part is the convex spherical surface part. Consequently, with this joint, the seal structure forming part is capable of forming a seal structure by making line contact with any location on the first tapered part, regardless of the angle of the first tapered part.

A joint according to a sixth aspect of the present invention is a joint according to any one of the first through fifth aspects of the present invention, wherein the seal structure forming part comprises a sealing member as a separate body. Furthermore, the sealing member forms a seal structure by contacting the first tapered part and deforming.

Here, the seal structure forming part comprises the sealing member as a separate body. Furthermore, this sealing member forms the seal structure by contacting the first tapered part and deforming. Consequently, with this joint, it is possible to form a rigid seal structure. In addition, with this joint, the sealing member can be arbitrarily replaced. Accordingly, with this joint, the reliability of the seal can be improved when tightening a number of times.

A joint according to a seventh aspect of the present invention is a joint according to the sixth aspect of the present invention, wherein the seal structure forming part further comprises a groove for supporting the sealing member.

Here, the seal structure forming part further comprises the groove for supporting the sealing member. Consequently, with this joint, it is possible to form a satisfactory seal structure without the risk of the sealing member shifting.

A joint according to an eighth aspect of the present invention is a joint according to any one of the first through seventh aspects of the present invention, wherein the push rod comprises a second projection part at the portion protruding from the push rod storage space. The second projection part projects toward the outer circumferential side of the push rod. Furthermore, the second projection part preferably is wider than the maximum passageway width of the second fluid passageway. Furthermore, when the female thread part and the male thread part are screwed together, then the second projection part contacts the first tapered part, and the push rod moves toward the opposite side of the push rod protruding side along the push rod longitudinal direction, and brings into communication the second fluid passageway and the communication path.

Here, the push rod comprises the second projection part at the portion protruding from the push rod storage space. Furthermore, when the female thread part and the male thread part are screwed together, then the second projection part contacts the first tapered part, the push rod moves toward the opposite side of the push rod protruding side along the push rod longitudinal direction, and brings into communication the second fluid passageway and the communication path. Consequently, with this joint, it is possible to make a connection even if the cross section spanning the surface orthogonal to the push rod longitudinal direction of the push rod is completely surrounded by the cross section spanning the surface orthogonal to the push rod longitudinal direction of the second fluid passageway in a state wherein the female thread part and the male thread part are screwed together.

A joint according to a ninth aspect of the present invention is a joint according to the eighth aspect of the present invention, wherein the second projection part comprises a third tapered part. The third tapered part is inclined toward the outer circumferential side and toward the opposite side of the push rod protruding side in the push rod longitudinal direction. Furthermore, when the female thread part and the male thread part are screwed together, then the third tapered part of the push rod contacts the first tapered part, and the push rod moves toward the opposite side of the push rod protruding side along the push rod longitudinal direction and brings into communication the second fluid passageway and the communication path.

Here, the projection part comprises the third tapered part. Consequently, with this joint, if the end part of the second projection part on the push rod protruding side in the push rod longitudinal direction contacts the tapered part of the nut member, then it is possible to achieve a satisfactory seal state with the nut member. In addition, if the angle formed by the inclination direction of the third tapered part with the push rod longitudinal direction is less than or equal to the angle formed by the inclination direction of the tapered part of the nut member with the push rod longitudinal direction in a state wherein the female thread part and the male thread part are screwed together, then it is possible to achieve a more satisfactory seal state between the end part thereof and the nut member.

A joint according to a tenth aspect of the present invention is a joint according to any one of the first through the seventh aspects of the present invention, wherein the push rod comprises a fourth tapered part. The fourth tapered part is provided at the end part of the push rod on the push rod protruding side in the push rod longitudinal direction. In addition, the fourth tapered part is inclined toward the outer circumferential side and toward the opposite side of the push rod protruding side in the push rod longitudinal direction. Furthermore, when the female thread part and the male thread part are screwed together, then the fourth tapered part contacts the first tapered part, and the push rod moves toward the opposite side of the push rod protruding side along the push rod longitudinal direction, and brings into communication the second fluid passageway and the communication path.

Here, the fourth tapered part is provided at the end part of the push rod on the push rod protruding side in the push rod longitudinal direction. Consequently, with this joint, if the end part of the push rod on the push rod protruding side in the push rod longitudinal direction contacts the tapered part of the nut member, and the like, then it is possible to achieve a satisfactory seal state between the end part thereof and the nut member. In addition, if the angle formed by the inclination direction of the fourth tapered part with the push rod longitudinal direction is less than or equal to the angle formed by the inclination direction of the tapered part of the nut member with the push rod longitudinal direction in a state wherein the female thread part and the male thread part are screwed together, then it is possible to achieve a more satisfactory seal state between the end part thereof and the nut member.

A joint according to the eleventh invention is a joint for bringing into communication: a third fluid passageway; and a fourth fluid passageway of a piping, which comprises the fourth fluid passageway and a fifth tapered part; and comprising a push rod, a main body, and a nut member. A fluid passes through the third fluid passageway. The fifth tapered part is inclined toward the radial direction of the piping and toward the end part. The main body comprises a push rod storage space, a communication path, a seal structure forming part, and a male thread part. The push rod storage space houses the push rod so that one part of the push rod protrudes along a push rod longitudinal direction. The communication path is a passageway for communicating with the third fluid passageway. Furthermore, this communication path is provided in the main body on an opposite side of a push rod protruding side of the push rod storage space in the push rod longitudinal direction. The seal structure forming part is provided at an end part of the main body on a push rod protruding side in the push rod longitudinal direction so that it surrounds the outer circumference of the push rod storage space. Furthermore, this seal structure forming part is capable of forming a seal structure by contacting the fifth tapered part. The nut member comprises a female thread part, an opening, and a sixth tapered part. The female thread part is capable of screwing together with the male thread part along the push rod longitudinal direction. The opening is provided for inserting the piping. The sixth tapered part is inclined toward the outer circumferential side and toward the female thread part. Furthermore, when the female thread part and the male thread part are screwed together in a state wherein the piping is inserted into the opening so that the fifth tapered part contacts the sixth tapered part, then the seal structure forming part and the sixth tapered part sandwich and press one part of the fifth tapered part. In addition, the end part of the push rod on the push rod protruding side contacts another part of the fifth tapered part, the push rod moves toward the opposite side of the push rod protruding side along the push rod longitudinal direction, and brings into communication the fourth fluid passageway and the communication path.

Here, the seal structure forming part and the sixth tapered part sandwich and press one part of the fifth tapered part when the female thread part and the male thread part are screwed together in a state wherein the piping is inserted into the opening so that the fifth tapered part contacts the sixth tapered part. Consequently, with this joint, the main body, the piping, and the nut member can be sealed by the seal structure forming part of the main body and the sixth tapered part of the nut member, without advancing the screwing together until the copper gasket deforms, as in a conventional joint. Accordingly, with this joint, the main body, the piping, and the nut member can be sealed with a low tightening torque. As a result, with this joint, cracking of the nut member can be prevented. In addition, with this joint, the same as with a conventional joint, the end part of the push rod on the push rod protruding side contacts another part of the fifth tapered part, the push rod moves toward the opposite side of the push rod protruding side along the push rod longitudinal direction, and brings into communication the fourth fluid passageway and the communication path. Consequently, with this joint as well, if the communication path and the third fluid passageway are brought into communication by a technique such as braising prior to screwing together the female thread part and the male thread part, then the fluid flowing to one fluid passageway can flow to another fluid passageway, the same as with a conventional joint.

A joint according to a twelfth aspect of the present invention is a joint according to the eleventh aspect of the present invention, wherein the seal structure forming part is a seventh tapered part. The seventh tapered part is inclined toward the outer circumferential side and toward the opposite side of the push rod protruding side in the push rod longitudinal direction.

A joint according to a thirteenth aspect of the present invention is a joint according to the twelfth aspect of the present invention, wherein an angle formed by an inclination direction of the seventh tapered part with the push rod longitudinal direction is less than or equal to an angle formed by an inclination direction of the sixth tapered part with the push rod longitudinal direction in a state wherein the female thread part and the male thread part are screwed together.

Here, the seal structure forming part is the seventh tapered part. Consequently, with this joint, the seal structure forming part is capable of forming the seal structure by surface contact with the fifth tapered part. Accordingly, with this joint, it is possible to form a satisfactory seal structure.

A joint according to a thirteenth aspect of the present invention is a joint according to the twelfth aspect of the present invention, wherein an angle formed by an inclination direction of the seventh tapered part with the push rod longitudinal direction is less than or equal to an angle formed by an inclination direction of the sixth tapered part with the push rod longitudinal direction in a state wherein the female thread part and the male thread part are screwed together.

Here, the angle formed by the inclination direction of the seventh tapered part with the push rod longitudinal direction is less than or equal to the angle formed by the inclination direction of the sixth tapered part with the push rod longitudinal direction in a state wherein the female thread part and the male thread part are screwed together. Consequently, with this joint, the fifth tapered part can be sandwiched and pressed by the entire surface of the seventh tapered part and the entire surface of the sixth tapered part, or the fifth tapered part can be sandwiched and pressed by the push rod protruding side of the seventh tapered part in the push rod longitudinal direction and the push rod protruding side of the sixth tapered part in the push rod longitudinal direction. Accordingly, with this joint, a satisfactory seal state between the main body, the piping, and the nut member can be achieved.

A joint according to a fourteenth aspect of the present invention is a joint according to the twelfth or the thirteenth aspect of the present invention, wherein the seventh tapered part is provided with a third projection part. The third projection part projects toward the outer circumferential side. Furthermore, the third projection part forms a seal structure by contacting the fifth tapered part.

A joint according to a fifteenth aspect of the present invention is a joint according to the eleventh aspect of the present invention, wherein the seal structure forming part is a convex spherical surface part.

Here, the seventh tapered part is provided with the third projection part. Furthermore, the third projection part forms a seal structure by contacting the fifth tapered part. Consequently, with this joint, it is possible to form a rigid seal structure.

A joint according to a fifteenth aspect of the present invention is a joint according to the eleventh aspect of the present invention, wherein the seal structure forming part is a convex spherical surface part.

Here, the seal structure forming part is the convex spherical surface part. Consequently, with this joint, the seal structure forming part is capable of forming a seal structure by making line contact with any location on the first tapered part, regardless of the angle of the first tapered part.

A joint according to a sixteenth aspect of the present invention is a joint according to any one of the eleventh through the fifteenth aspects of the present invention, wherein the seal structure forming .part comprises a sealing member as a separate body. Furthermore, the sealing member forms a seal structure by contacting the fifth tapered part and deforming.

Here, the seal structure forming part comprises the sealing member as a separate body. Furthermore, this sealing member forms the seal structure by contacting the fifth tapered part and deforming. Consequently, with this joint, it is possible to form a rigid seal structure. In addition, with this joint, the sealing member can be arbitrarily replaced. Accordingly, with this joint, the reliability of the seal can be improved when tightening a number of times.

A joint according to a seventeenth aspect of the present invention is a joint according to the sixteenth aspect of the present invention, wherein the seal structure forming part further comprises a groove for supporting the sealing member.

Here, the seal structure forming part further comprises the groove for supporting the sealing member. Consequently, with this joint, it is possible to form a satisfactory seal structure without the risk of the sealing member shifting.

A joint according to an eighteenth invention is a joint according to any one of the eleventh through the seventeenth aspects of the present invention, wherein the push rod comprises a fourth projection part at the portion protruding from the push rod storage space. The fourth projection part projects toward the outer circumferential side of the push rod. Furthermore, the fourth projection part preferably is wider than the maximum passageway width of the fourth fluid passageway. Furthermore, when the female thread part and the male thread part are screwed together in a state wherein the piping is inserted into the opening so that the fifth tapered part contacts the sixth tapered part, then the fourth projection part contacts another part of the fifth tapered part, and the push rod moves toward the opposite side of the push rod protruding side along the push rod longitudinal direction, and brings into communication the fourth fluid passageway and the communication path.

Here, the push rod comprises the fourth projection part at the portion protruding from the push rod storage space. Furthermore, when the female thread part and the male thread part are screwed together, then the fourth projection part contacts the fifth tapered part, the push rod moves toward the opposite side of the push rod protruding side along the push rod longitudinal direction, and brings into communication the fourth fluid passageway and the communication path. Consequently, with this joint, it is possible to make a connection even if the cross section spanning the surface orthogonal to the push rod longitudinal direction of the push rod is completely surrounded by the cross section spanning the surface orthogonal to the push rod longitudinal direction of the fourth fluid passageway in a state wherein the female thread part and the male thread part are screwed together.

A joint according to a nineteenth aspect of the present invention is a joint according to the eighteenth aspect of the present invention, wherein the fourth projection part comprises an eighth tapered part. The eighth tapered part is inclined toward the outer circumferential side and toward the opposite side of the push rod protruding side in the push rod longitudinal direction. Furthermore, when the female thread part and the male thread part are screwed together in a state wherein the piping is inserted into the opening so that the fifth tapered part contacts the sixth tapered part, then the eighth tapered part of the push rod contacts another part of the fifth tapered part, and the push rod moves toward the opposite side of the push rod protruding side along the push rod longitudinal direction and brings into communication the fourth fluid passageway and the communication path.

Here, the projection part comprises the eighth tapered part. Consequently, with this joint, when the end part of the fourth projection part on the push rod protruding side in the push rod longitudinal direction contacts the tapered part of the piping, then it is possible to achieve a satisfactory seal state with the piping. In addition, if the angle formed by the inclination direction of the eighth tapered part with the push rod longitudinal direction is less than or equal to the angle formed by the inclination direction of the tapered part of the piping with the push rod longitudinal direction in a state wherein the female thread part and the male thread part are screwed together, then it is possible to achieve a more satisfactory seal state between the end part thereof and the piping, and the like.

A joint according to a twentieth aspect of the present invention is a joint according to any one of the eleventh through the seventeenth aspects of the present invention, wherein the push rod comprises a ninth tapered part. The ninth tapered part is provided at the end part of the push rod on the push rod protruding side in the push rod longitudinal direction. In addition, the ninth tapered part is inclined toward the outer circumferential side and toward the opposite side of the push rod protruding side in the push rod longitudinal direction. Furthermore, when the female thread part and the male thread part are screwed together in a state wherein the piping is inserted into the opening so that the fifth A joint according to a twentieth aspect of the present invention is a joint according to any one of the eleventh through the seventeenth aspects of the present invention, wherein the push rod comprises a ninth tapered part. The ninth tapered part is provided at the end part of the push rod on the push rod protruding side in the push rod longitudinal direction. In addition, the ninth tapered part is inclined toward the outer circumferential side and toward the opposite side of the push rod protruding side in the push rod longitudinal direction. Furthermore, when the female thread part and the male thread part are screwed together in a state wherein the piping is inserted into the opening so that the fifth tapered part contacts the sixth tapered part, then the ninth tapered part contacts another part of the fifth tapered part, and the push rod moves toward the opposite side of the push rod protruding side along the push rod longitudinal direction, and brings into communication the fourth fluid passageway and the communication path.

Here, the ninth tapered part is provided at the end part of the push rod on the push rod protruding side in the push rod longitudinal direction. Consequently, with this joint, if the end part of the push rod on the push rod protruding side in the push rod longitudinal direction contacts the tapered part of the piping, then it is possible to achieve a satisfactory seal state between the end part thereof and the piping. In addition, if the angle formed by the inclination direction of the ninth tapered part with the push rod longitudinal direction is less than or equal to the angle formed by the inclination direction of the tapered part of the piping with the push rod longitudinal direction in a state wherein the female thread part and the male thread part are screwed together, then it is possible to achieve a more satisfactory seal state between the end part thereof, the nut member, the piping, and the like.

Effects of the Invention

With the joint according to the first aspect of the present invention, the main body and the nut member can be sealed with a low tightening torque. As a result, with this joint, cracking of the nut member can be prevented. In addition, with this joint, the same as with a conventional joint, one part of the portion of the push rod protruding from the push rod storage space contacts one part of the nut member, the push rod moves toward the opposite side of the push rod protruding side along the push rod longitudinal direction, and brings into communication the second fluid passageway and the communication path. Consequently, with this joint as well, if the communication path and the first fluid passageway are brought into communication by a technique such as braising prior to screwing together the female thread part and the male thread part, then the fluid flowing to one fluid passageway can flow to another fluid passageway, the same as with a conventional joint.

With the joint according to the second aspect of the present invention, with this joint, the seal structure forming part is capable of forming the seal structure by surface contact with the first tapered part. Accordingly, with this joint, it is possible to form a satisfactory seal structure.

With the joint according to the third aspect of the present invention, when the female thread part and the male thread part are screwed together, then the entire surface of the second tapered part can contact the entire surface of the first tapered part, or the push rod protruding side of the second tapered part in the push rod longitudinal direction can contact the push rod protruding side of the first tapered part in the push rod longitudinal direction. Accordingly, with this joint, a satisfactory seal state between the main body and the nut member can be achieved.

With the joint according to the fourth aspect of the present invention, it is possible to form a rigid seal structure.

With the joint according to the fifth aspect of the present invention, the seal structure forming part is capable of forming a seal structure by making line contact with any location on the first tapered part, regardless of the angle of the first tapered part.

With the joint according to the sixth aspect of the present invention, it is possible to form a rigid seal structure. In addition, with this joint, the sealing member can be arbitrarily replaced. Accordingly, with this joint, the reliability of the seal can be improved when tightening a number of times.

With the joint according to the seventh aspect of the present invention, it is possible to form a satisfactory seal structure without the risk of the sealing member shifting.

With the joint according to the eighth aspect of the present invention, it is possible to make a connection even if the cross section spanning the surface orthogonal to the push rod longitudinal direction of the push rod is completely surrounded by the cross section spanning the surface orthogonal to the push rod longitudinal direction of the second fluid passageway in a state wherein the female thread part and the male thread part are screwed together.

With the joint according to the ninth aspect of the present invention, if the end part of the second projection part on the push rod protruding side in the push rod longitudinal direction contacts the tapered part of the nut member, then it is possible to achieve a satisfactory seal state with the nut member. In addition, if the angle formed by the inclination direction of the third tapered part with the push rod longitudinal direction is less than or equal to the angle formed by the inclination direction of the tapered part of the nut member with the push rod longitudinal direction in a state wherein the female thread part and the male thread part are screwed together, then it is possible to achieve a more satisfactory seal state between the end part thereof and the nut member.

With the joint according to the tenth aspect of the present invention, if the end part of the push rod on the push rod protruding side in the push rod longitudinal direction contacts the tapered part of the nut member, and the like, then it is possible to achieve a satisfactory seal state between the end part thereof and the nut member. In addition, if the angle formed by the inclination direction of the fourth tapered part with the push rod longitudinal direction is less than or equal to the angle formed by the inclination direction of the tapered part of the nut member with the push rod longitudinal direction in a state wherein the female thread part and the male thread part are screwed together, then it is possible to achieve a more satisfactory seal state between the end part thereof and the nut member.

With the joint according to the eleventh aspect of the present invention, the main body, the piping, and the nut member can be sealed by the seal structure forming part of the main body and the sixth tapered part of the nut member, without advancing the screwing together until the copper gasket deforms, as in a conventional joint. Accordingly, with this joint, the main body, the piping, and the nut member can be sealed with a low tightening torque. As a result, with this joint, cracking of the nut member can be prevented. In addition, with this joint, the same as with a conventional joint, the end part of the push rod on the push rod protruding side contacts another part of the fifth tapered part, the push rod moves toward the opposite side of the push rod protruding side along the push rod longitudinal direction, and brings into communication the fourth fluid passageway and the communication path. Consequently, with this joint as well, if the communication path and the third fluid passageway are brought into communication by a technique such as braising prior to screwing together the female thread part and the male thread part, then the fluid flowing to one fluid passageway can flow to another fluid passageway, the same as with a conventional joint.

With the joint according to the twelfth aspect of the present invention, the seal structure forming part is capable of forming the seal structure by surface contact with the fifth tapered part. Accordingly, with this joint, it is possible to form a satisfactory seal structure.

With the joint according to the thirteenth aspect of the present invention, the fifth tapered part can be sandwiched and pressed by the entire surface of the seventh tapered part and the entire surface of the sixth tapered part, or the fifth tapered part can be sandwiched and pressed by the push rod protruding side of the seventh tapered part in the push rod longitudinal direction and the push rod protruding side of the sixth tapered part in the push rod longitudinal direction. Accordingly, with this joint, a satisfactory seal state between the main body, the piping, and the nut member can be achieved.

With the joint according to the fourteenth aspect of the present invention, it is possible to form a rigid seal structure.

With the joint according to the fifteenth aspect of the present invention, the seal structure forming part is capable of forming a seal structure by making line contact with any location on the first tapered part, regardless of the angle of the first tapered part.

With the joint according to the sixteenth aspect of the present invention, it is possible to form a rigid seal structure. In addition, with this joint, the sealing member can be arbitrarily replaced. Accordingly, with this joint, the reliability of the seal can be improved when tightening a number of times.

With the joint according to the seventeenth aspect of the present invention, it is possible to form a satisfactory seal structure without the risk of the sealing member shifting.

With the joint according to the eighteenth aspect of the present invention, it is possible to make a connection even if the cross section spanning the surface orthogonal to the push rod longitudinal direction of the push rod is completely surrounded by the cross section spanning the surface orthogonal to the push rod longitudinal direction of the fourth fluid passageway in a state wherein the female thread part and the male thread part are screwed together.

With the joint according to the nineteenth aspect of the present invention, if the end part of the fourth projection part on the push rod protruding side in the push rod longitudinal direction contacts the tapered part of the piping, then it is possible to achieve a satisfactory seal state with the piping. In addition, if the angle formed by the inclination direction of the eighth tapered part with the push rod longitudinal direction is less than or equal to the angle formed by the inclination direction of the tapered part of the piping with the push rod longitudinal direction in a state wherein the female thread part and the male thread part are screwed together, then it is possible to achieve a more satisfactory seal state between the end part thereof and the piping, and the like.

With the joint according to the twentieth aspect of the present invention, if the end part of the push rod on the push rod protruding side in the push rod longitudinal direction contacts the tapered part of the piping, then it is possible to achieve a satisfactory seal state between the end part thereof and the piping. In addition, if the angle formed by the inclination direction of the ninth tapered part with the push rod longitudinal direction is less than or equal to the angle formed by the inclination direction of the tapered part of the piping with the push rod longitudinal direction in a state wherein the female thread part and the male thread part are screwed together, then it is possible to achieve a more satisfactory seal state between the end part thereof, the nut member, the piping, and the like.

BRIEF EXPLANATION OF DRAWINGS

FIG. 1(*b*) is a longitudinal cross sectional view of a pressure sensor connecting nut.

FIG. 1(*c*) depicts the state wherein the screwing together of a conventional joint and a pressure sensor connecting nut is completed.

FIG. 1(*d*) is a partial longitudinal cross sectional view of a flared copper pipe.

FIG. 1(*e*) is a longitudinal cross sectional view of a flared copper pipe connecting nut.

FIG. 1(*f*) depicts the state wherein the flared copper pipe has been inserted into the flared copper pipe connecting nut.

FIG. 1(*g*) depicts the state wherein the screwing together of the conventional joint and the flared copper pipe connecting nut is completed.

FIG. 2(*b*) depicts the state wherein the screwing together of the joint according to the present invention and the pressure sensor connecting nut is completed.

FIG. 2(*c*) depicts the state wherein the screwing together of the joint according to the present invention and the flared copper pipe connecting nut is completed.

FIG. 3(*b*) is a longitudinal cross sectional view of the pressure sensor connecting nut according to the modified example (A).

FIG. 3(*c*) depicts the state wherein the screwing together of the joint according to the modified example (A) and the pressure sensor connecting nut is completed.

FIG. 3(*d*) is a longitudinal cross sectional view of the flared copper pipe and a flared copper pipe connecting nut according to the modified example (A).

FIG. 3(*e*) depicts the state wherein the screwing together of the joint and the flared copper pipe connecting nut according to the modified example (A) is completed.

FIG. 4(*b*) is a cross sectional view of one part of the joint according to the modified example (D).

FIG. 4(*c*) is a cross sectional view of one part of the joint according to the modified example (D).

FIG. 4(*d*) is a cross sectional view of one part of the joint according to the modified example (E).

FIG. 4(*e*) is a cross sectional view of one part of the joint according to the modified example (E).

FIG. 4(*f*) is a cross sectional view of one part of the joint according to the modified example (F).

FIG. 4(*g*) is a cross sectional view of one part of the joint according to the modified example (F).

FIG. 4(*h*) is a cross sectional view of one part of the joint according to the modified example (F).

DETAILED DESCRIPTION OF THE INVENTION

Structure of the Joint

Figure 2A:
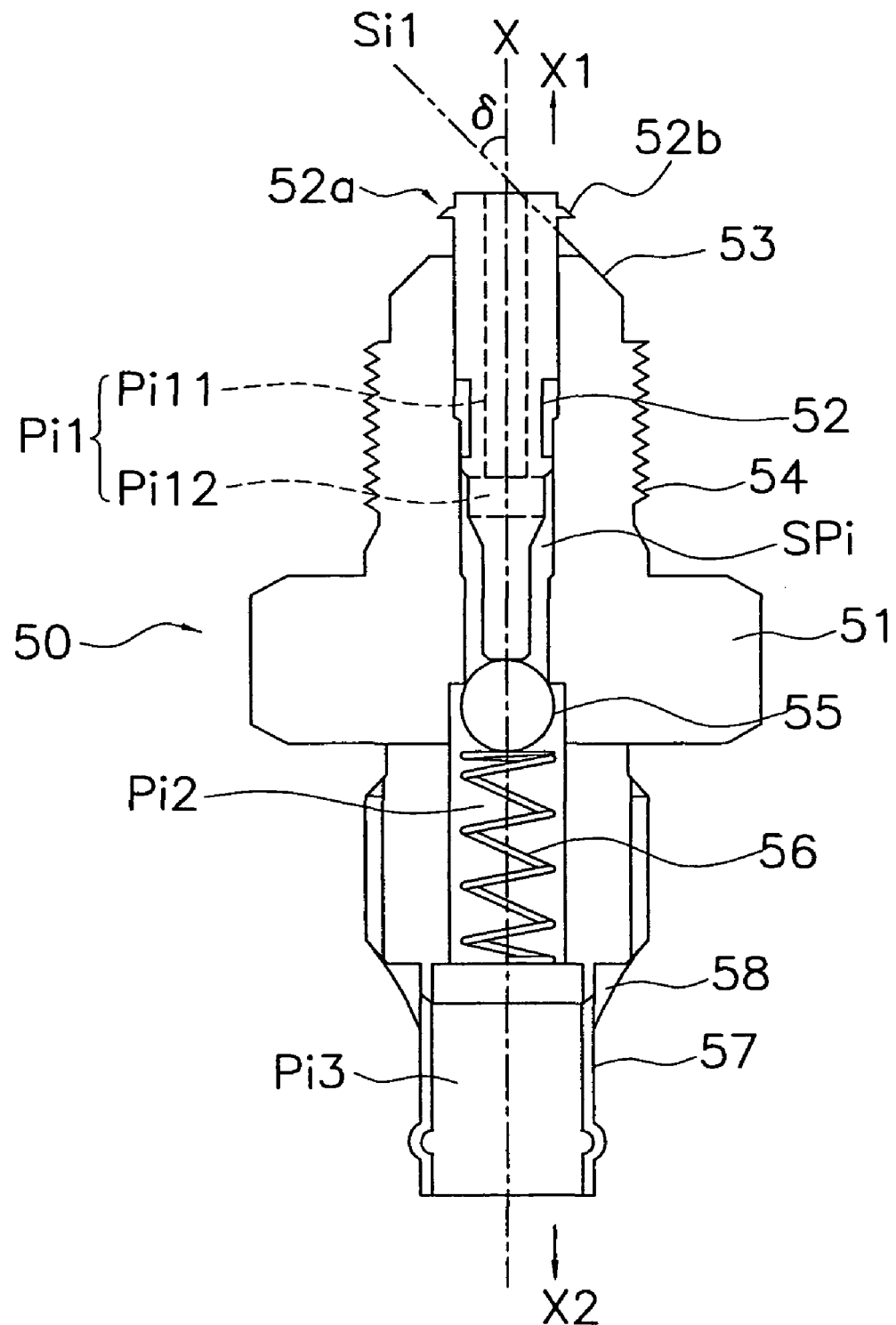
FIG. 2(*a*) is a longitudinal cross sectional view of the joint according to the present invention.

A longitudinal cross sectional view of the joint according to the present invention is depicted in FIG. 2(*a*).

The joint 50 comprises a push rod 52, a main body 51, a steel ball 55, a spring 56, and a copper pipe part 57, as depicted in FIG. 2(*a*).

Constituent Elements of the Joint (1) Push Rod

The push rod 52 comprises a projection part 52*a*, a first passageway Pi11, and a second passageway Pi12.

The projection part 52*a* is provided at the outer circumference of the push rod 52, and comprises a projection tapered part 52*b*. Furthermore, the projection tapered part 52*b* is inclined toward the outer circumferential side and toward an opposite side X2 of a push rod protruding side in a push rod longitudinal direction X. Furthermore, the projection tapered part 52*b* is formed so that the angle formed by the inclination direction of the projection tapered part 52*b* with the push rod longitudinal direction X is greater than or equal to a prescribed angle and is less than or equal to the angle formed by the inclination direction of a main body tapered part 53 (discussed later) with the push rod longitudinal direction X. In addition, in a state wherein the push rod 52 is housed in a push rod storage space SPi (discussed later) of the main body 51, the end part of the push rod 52 on the opposite side X2 of the push rod protruding side in the push rod longitudinal direction X contacts the steel ball 55. Furthermore, at this juncture, the push rod 52 and the steel ball 55 is urged toward a push rod protruding side X1 in the push rod longitudinal direction X by the spring 56. In other words, if an external force is applied from the push rod protruding side X1 in the push rod longitudinal direction X, the push rod 52 is capable of moving toward the opposite side X2 of the push rod protruding side along the push rod longitudinal direction X. The first passageway Pi11 is formed along the push rod longitudinal direction X. In addition, the second passageway Pi12 is formed along the direction perpendicular to the push rod longitudinal direction X. Furthermore, the first passageway Pi11 and the second passageway Pi12 are in communication and form a first transit path Pi1.

(2) Main Body

Figure 1A:
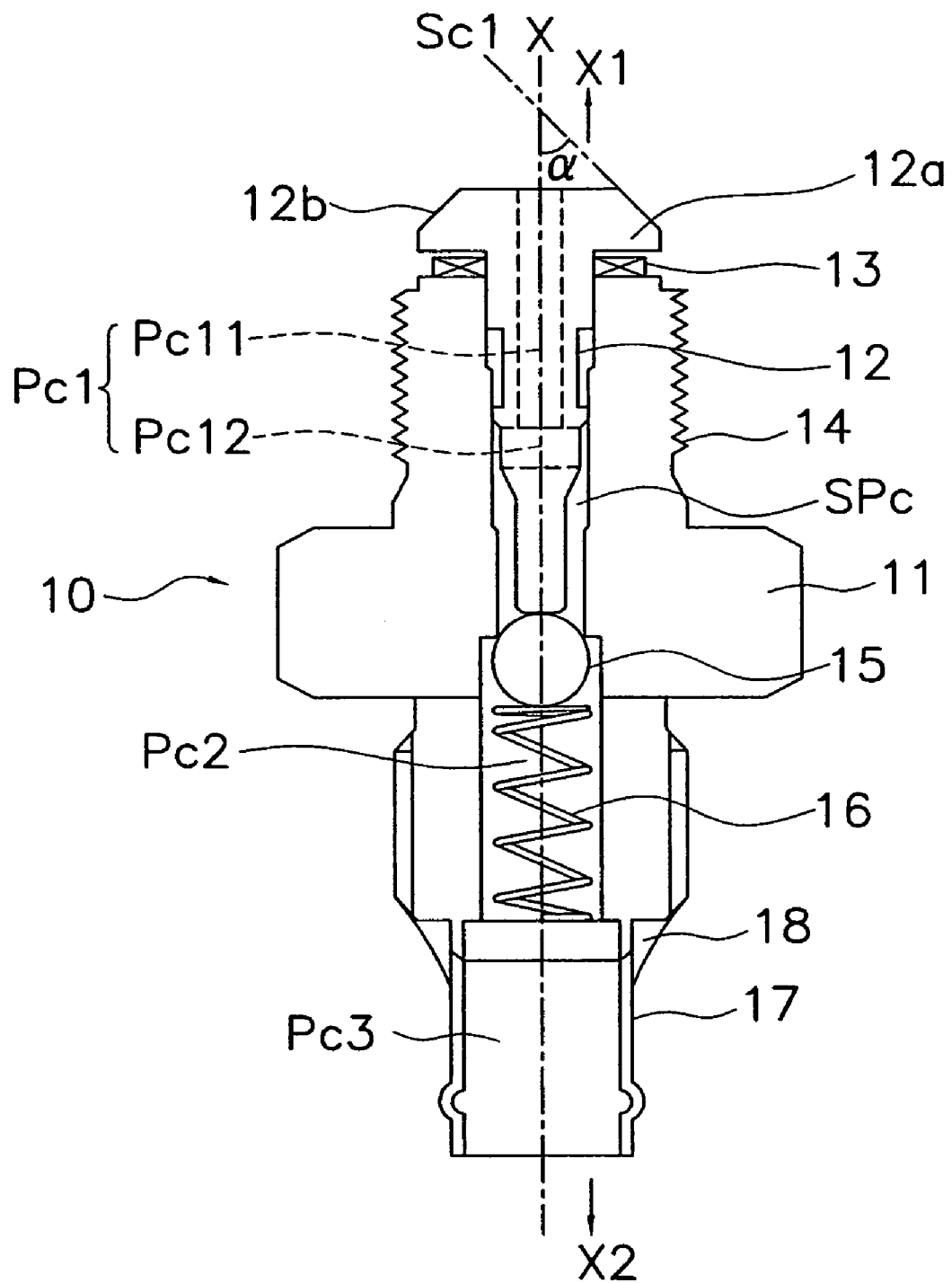
FIG. 1(*a*) is a longitudinal cross sectional view of a conventional joint.
Figure 1B:
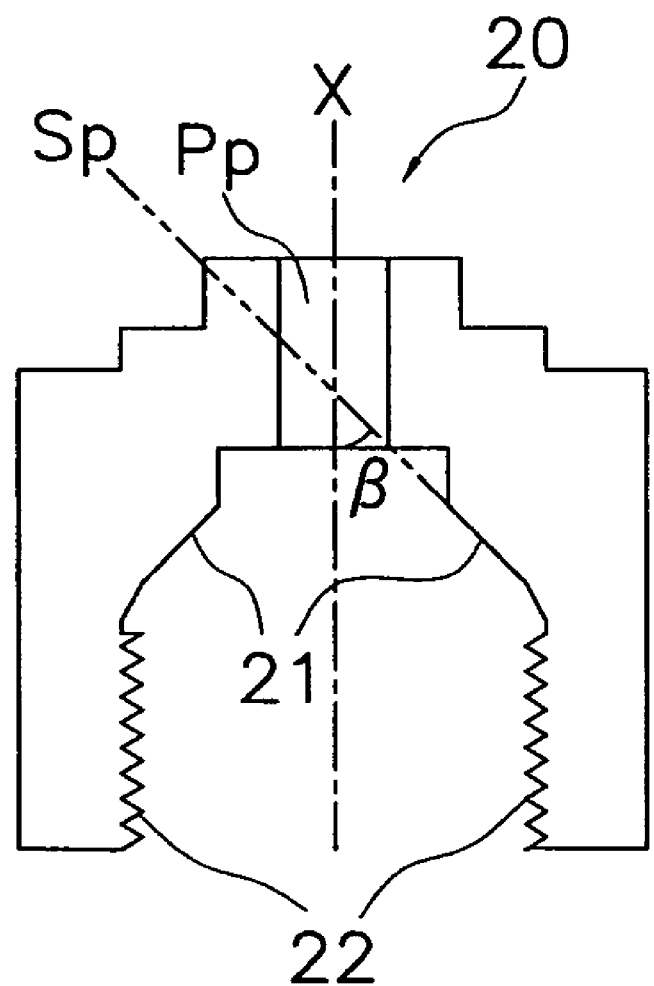
Figure 1C:
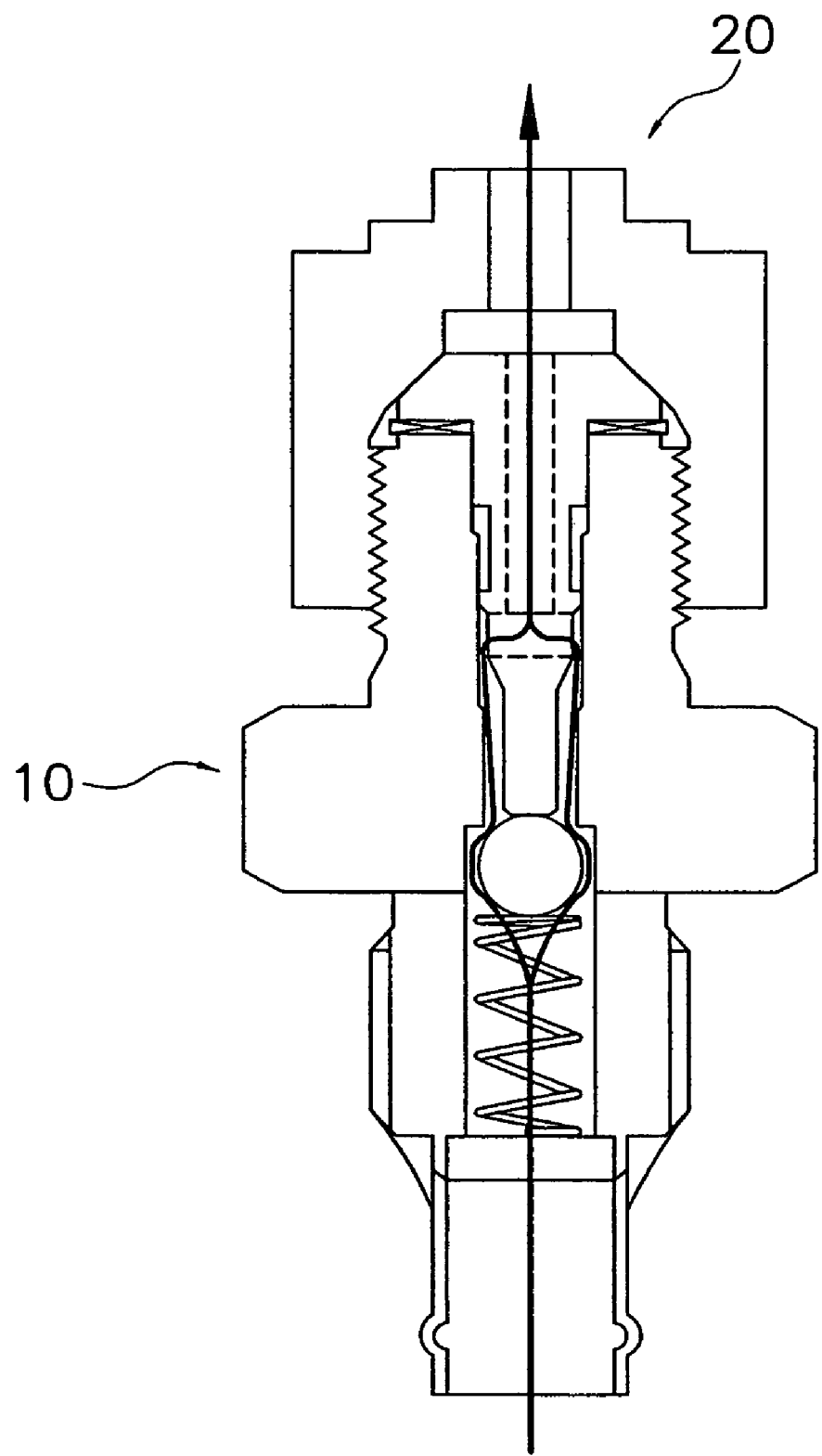

The main body 51 comprises the push rod storage space SPi, a male thread part 54, the main body tapered part 53, and a second transit path Pi2. The push rod 52 is housed in the push rod storage space SPi so that one part of the push rod 52 that includes the projection part 52a protrudes externally. Furthermore, the push rod storage space SPi, in a state wherein the push rod 52 is so housed, is in communication with the first transit path Pi1. The male thread part 54 is provided so that it surrounds the outer circumference of the push rod storage space on the opposite side X2 of the push rod protruding side of the main body tapered part 53 in the push rod longitudinal direction X. Furthermore, the male thread part 54 is capable of screwing together with a female thread part 22 of a pressure sensor connecting nut 20 along the push rod longitudinal direction X (refer to FIG. 1(b)). The main body tapered part 53 is provided at the end part of the main body on the push rod protruding side X1 in the push rod longitudinal direction X so that it surrounds the outer circumference of the push rod storage space SPi and is inclined toward the outer circumferential side and toward the opposite side X2 of the push rod protruding side in the push rod longitudinal direction X. Furthermore, the main body tapered part 53 is formed so that an angle 6 formed by an inclination direction Si1 with the push rod longitudinal direction X is greater than or equal to a prescribed angle and is less than or equal to an angle β formed by an inclination direction Sp of the nut tapered part 21 with the push rod longitudinal direction X in a state wherein the female thread part 22 of the pressure sensor connecting nut 20 and the male thread part 54 are screwed together along the push rod longitudinal direction X. In addition, if the joint 50, in cooperation with a flared copper pipe connecting nut 40 depicted in FIG. 1(e), connects a flared copper pipe 30 depicted in FIG. 1(d) with another copper piping (not shown), then the main body tapered part 53 is formed so that the angle δ formed by the inclination direction Si1 with the push rod longitudinal direction X is greater than or equal to a prescribed angle and is less than or equal to an angle γ formed by an inclination direction Sf of a nut tapered part 41 with the push rod longitudinal direction X in a state wherein a female thread part 42 and a male thread part 54 are screwed together along the push rod longitudinal direction X. The fluid that comes flowing from a fluid passageway of a copper piping (not shown) which is to be connected, flows to the second transit path Pi2.

(3) Steel Ball

The steel ball 55 is disposed in the second transit path Pi2 and urged by the spring 56, thereby separating between the push rod storage space SPi and the second transit path Pi2.

(4) Spring

The spring 56 is disposed in the second transit path Pi2, the same as the steel ball 55, and urges the push rod 52 and the steel ball 55, as discussed above.

(5) Copper Pipe Part

The copper pipe part 57 comprises a third transit path Pi3 and is connected to the lower end of the main body 51 by a solder 58.

Furthermore, the lower end of the copper pipe part 57 is connected to the copper piping (not shown) by braising beforehand so that the passageway of the copper piping (not shown) which is to be connected, and the third transit path Pi3 of the copper pipe part 57 are in communication.

Connection Mode of Joint and Pressure Sensor Connecting Nut

When the male thread part 54 of a joint 50 and the female thread part 22 of the pressure sensor connecting nut 20 are screwed together, the end part of the push rod 52 on the push rod protruding side X1 in the push rod longitudinal direction X first comes into contact with a flat surface part formed on the pressure sensor connecting nut 20 on the opposite side X2 of the push rod protruding side of a passageway Pp in the push rod longitudinal direction X, and the push rod 52 and the steel ball 55 then begin to move against the spring force of the spring 56 toward the opposite side X2 of the push rod protruding side in the push rod longitudinal direction X.

Figure 2B:
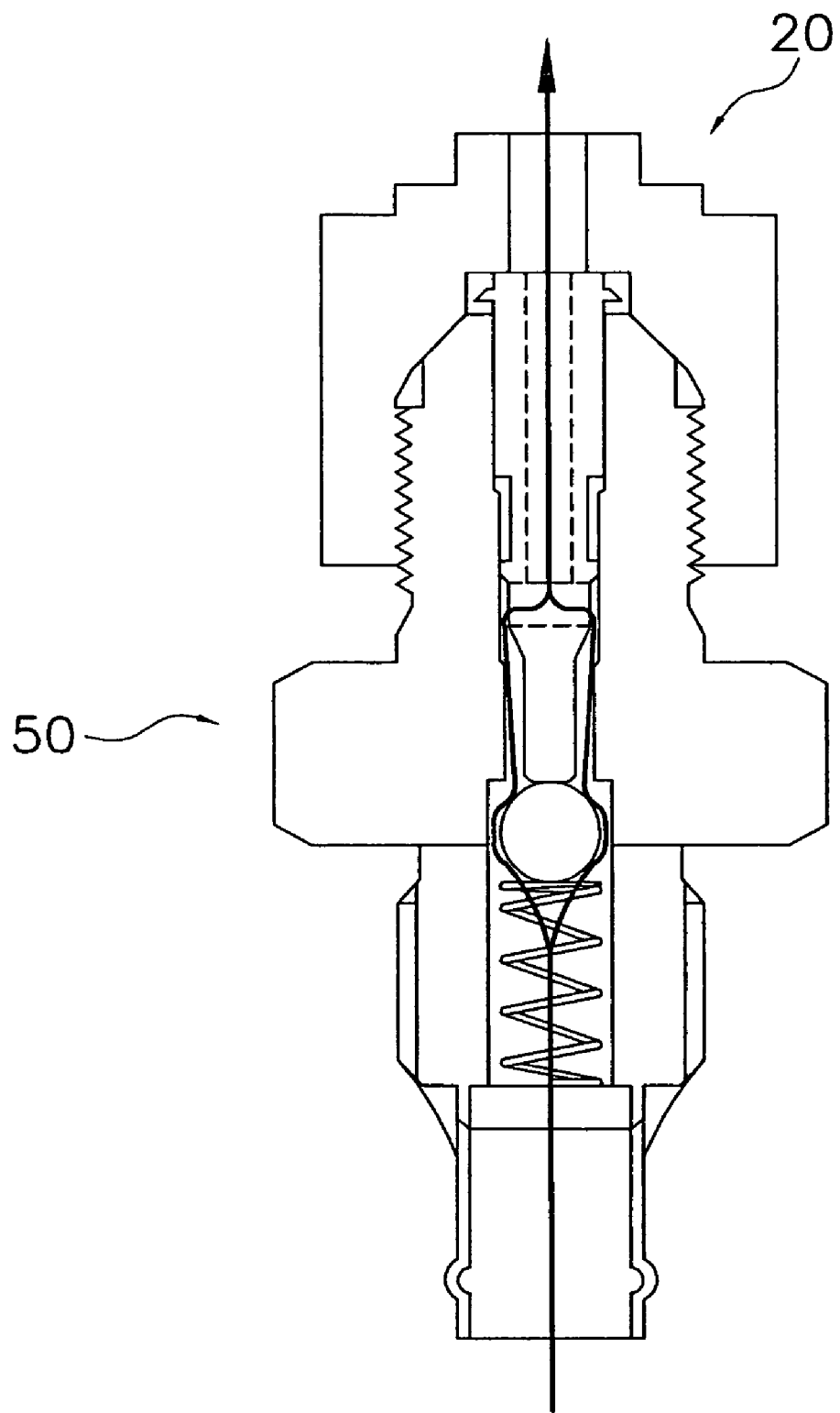
Figure 2C:
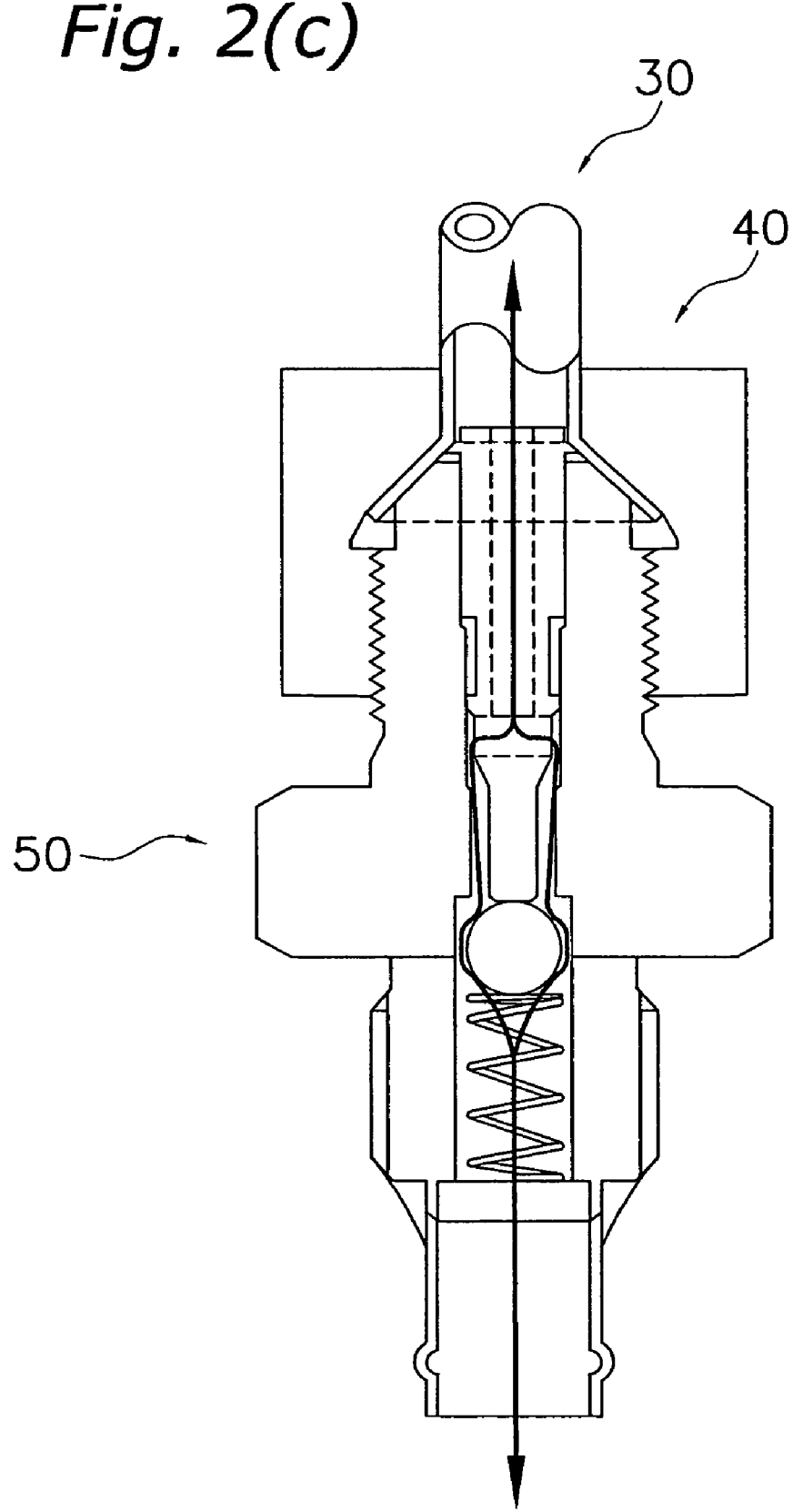
Figure 3A:
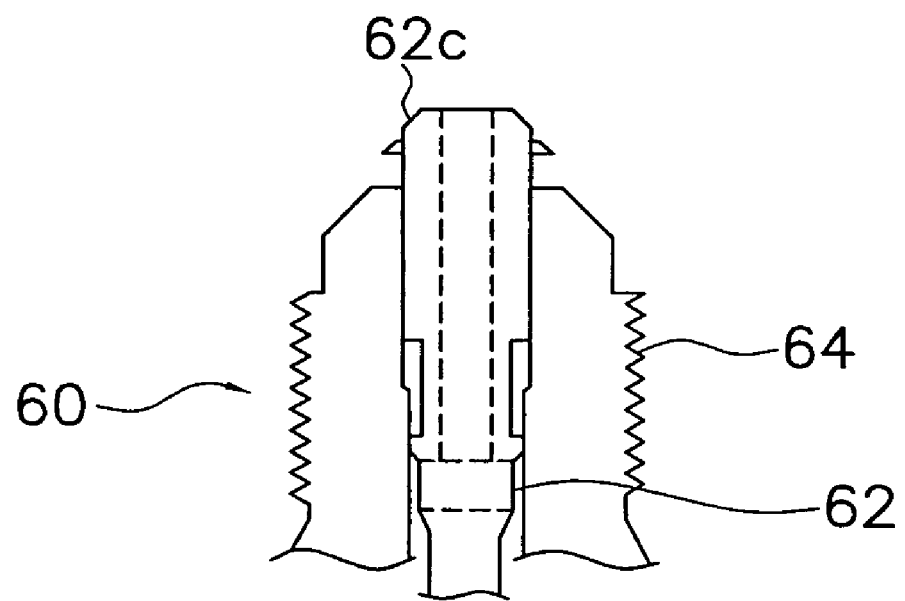
FIG. 3(*a*) is a cross sectional view of one part of the joint according to a modified example (A).
Figure 3B:
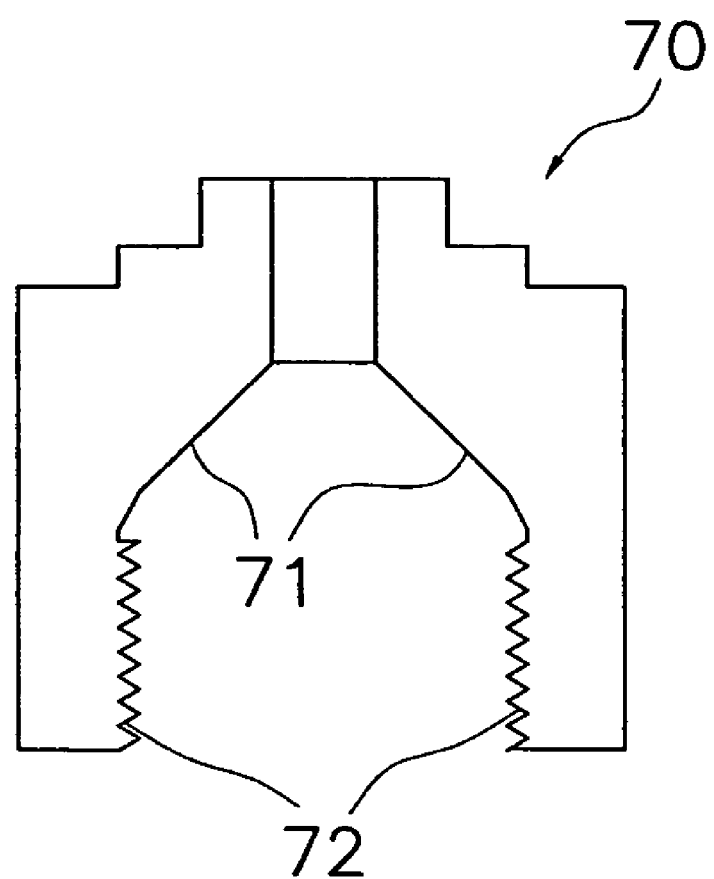
Figure 3C:
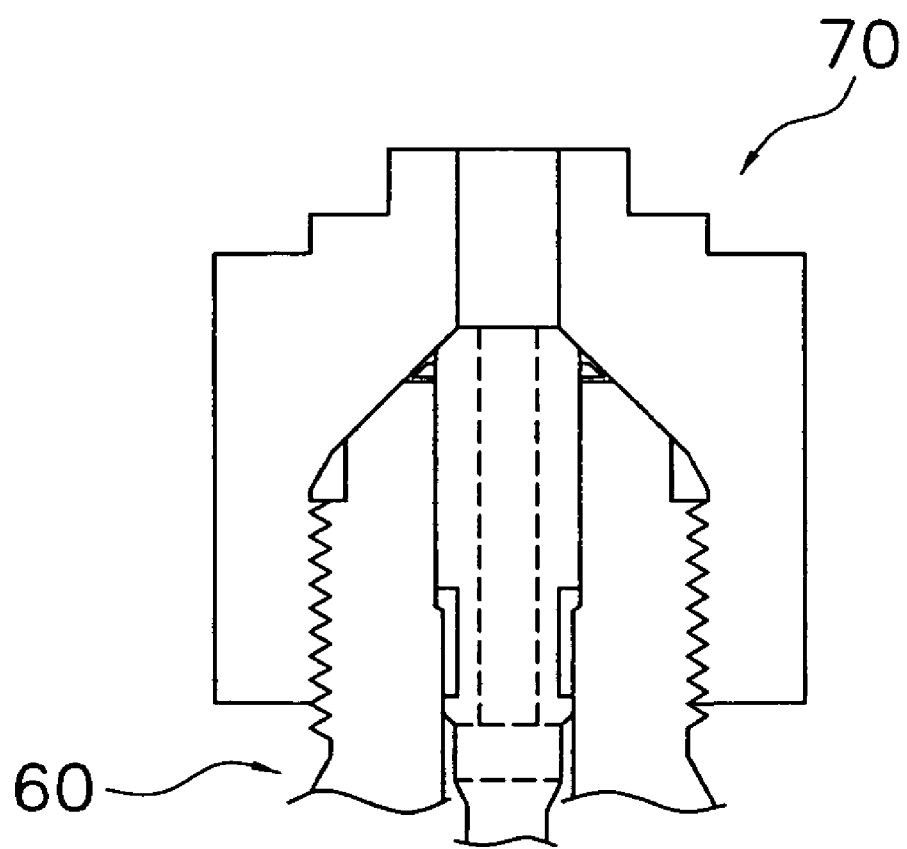
Figure 3D:
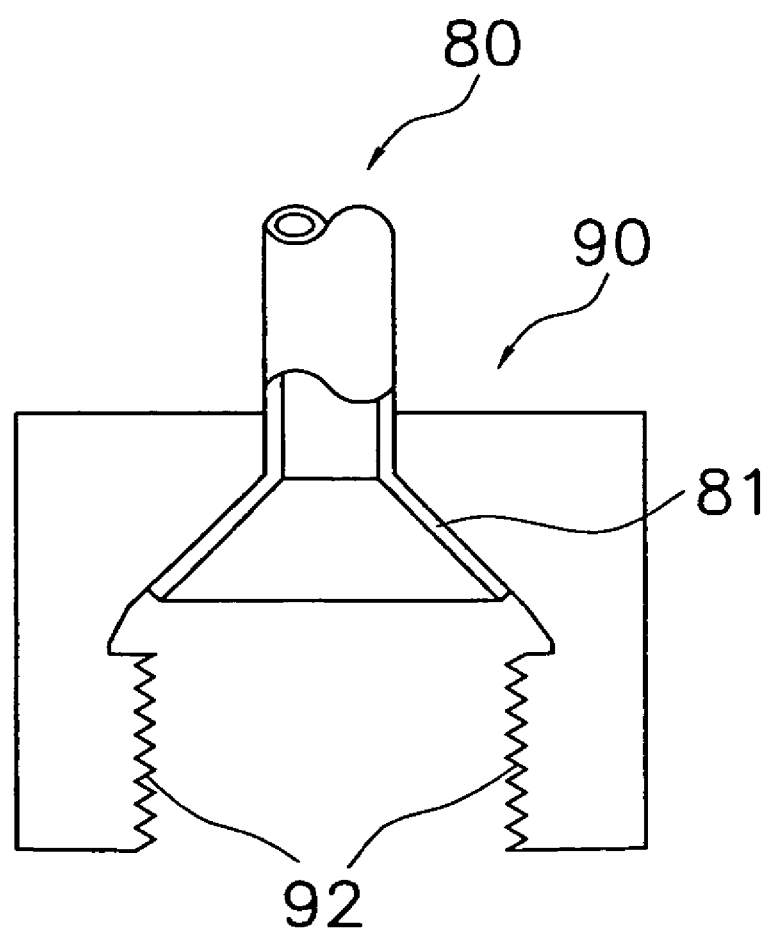
Figure 3E:
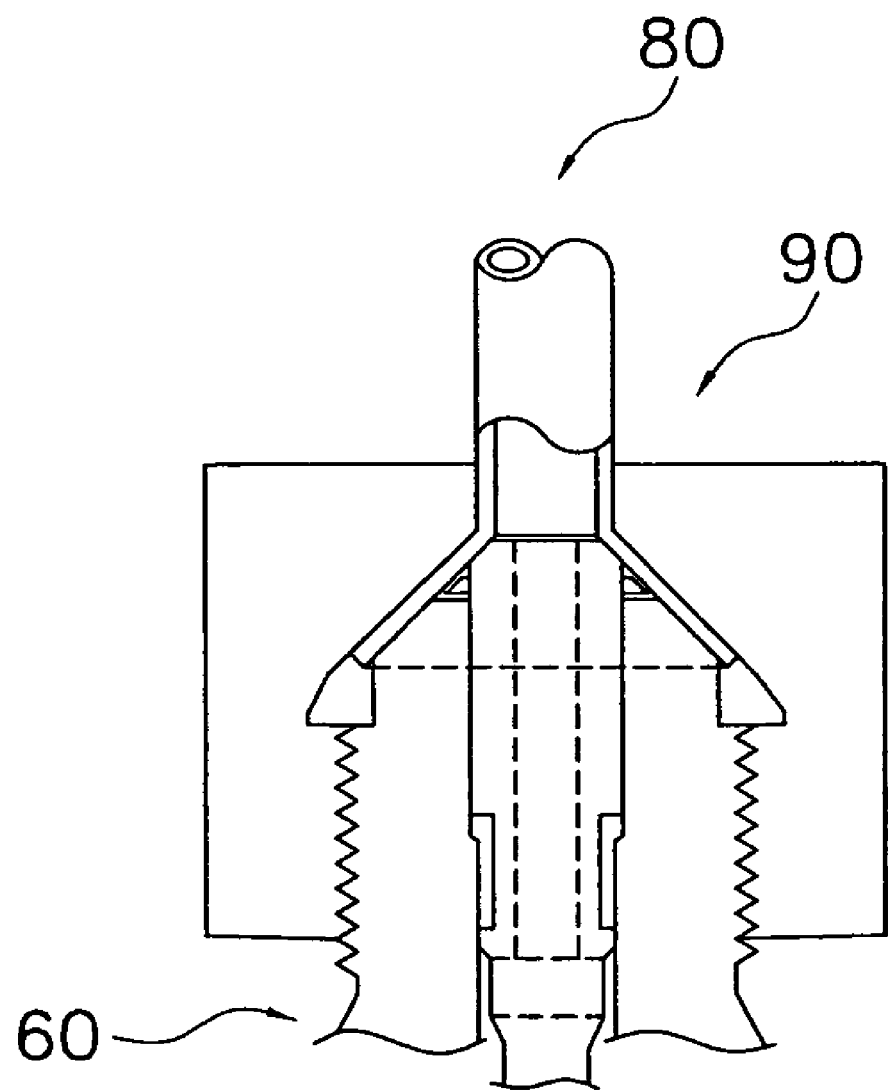
Figure 4A:
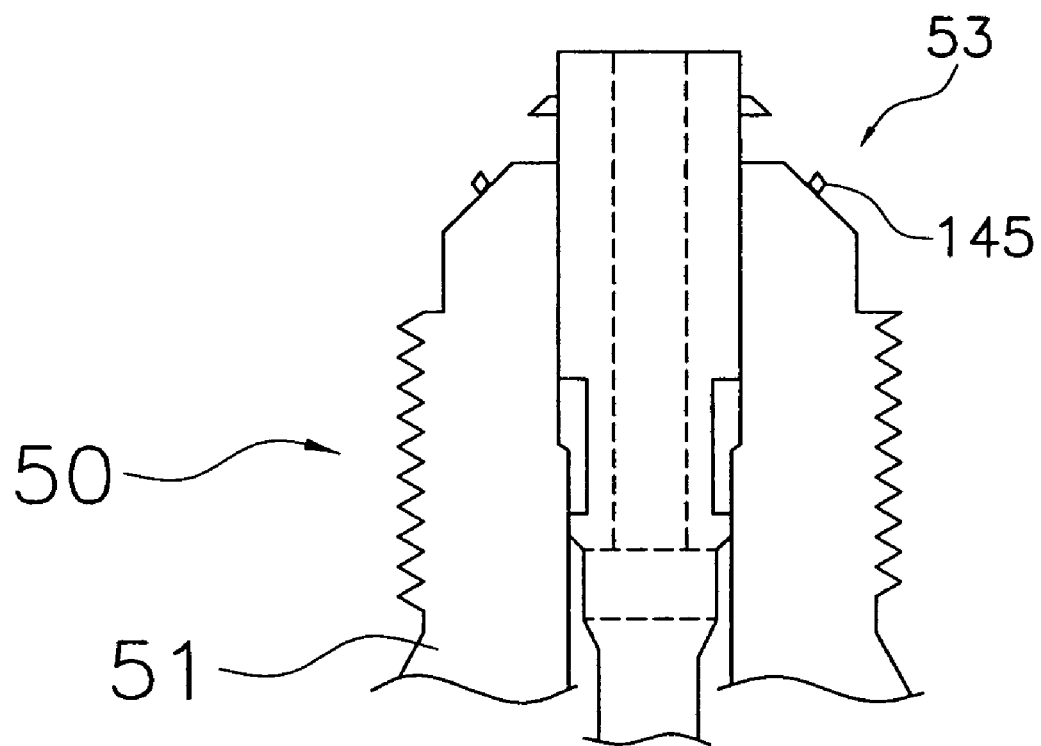
FIG. 4(*a*) is a cross sectional view of one part of the joint according to the modified example (D).
Figure 4B:
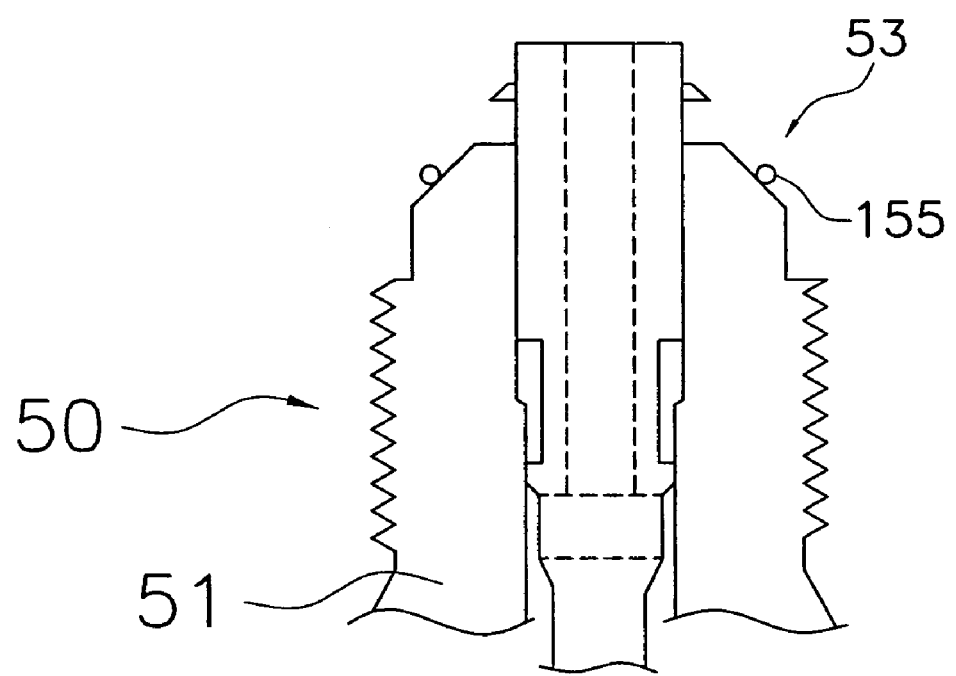
Figure 4C:
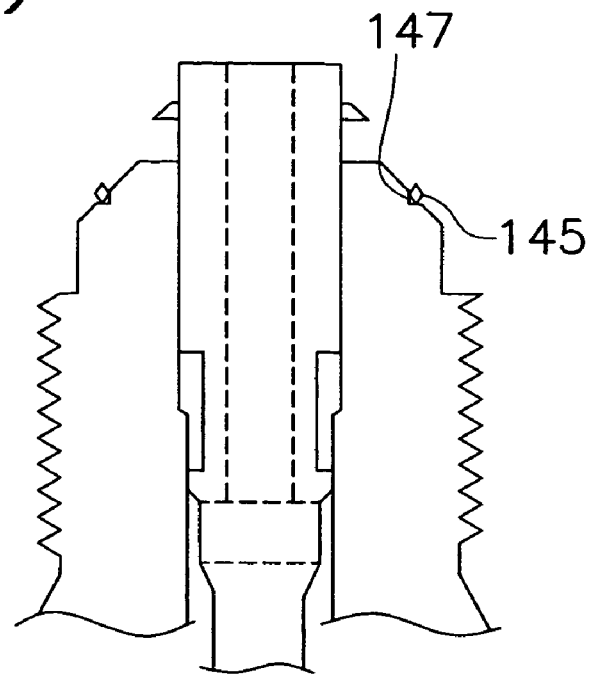
Figure 4D:
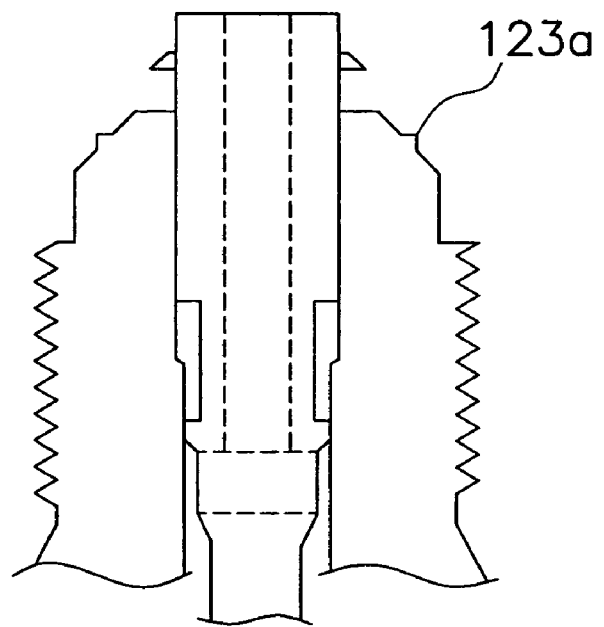
Figure 4E:
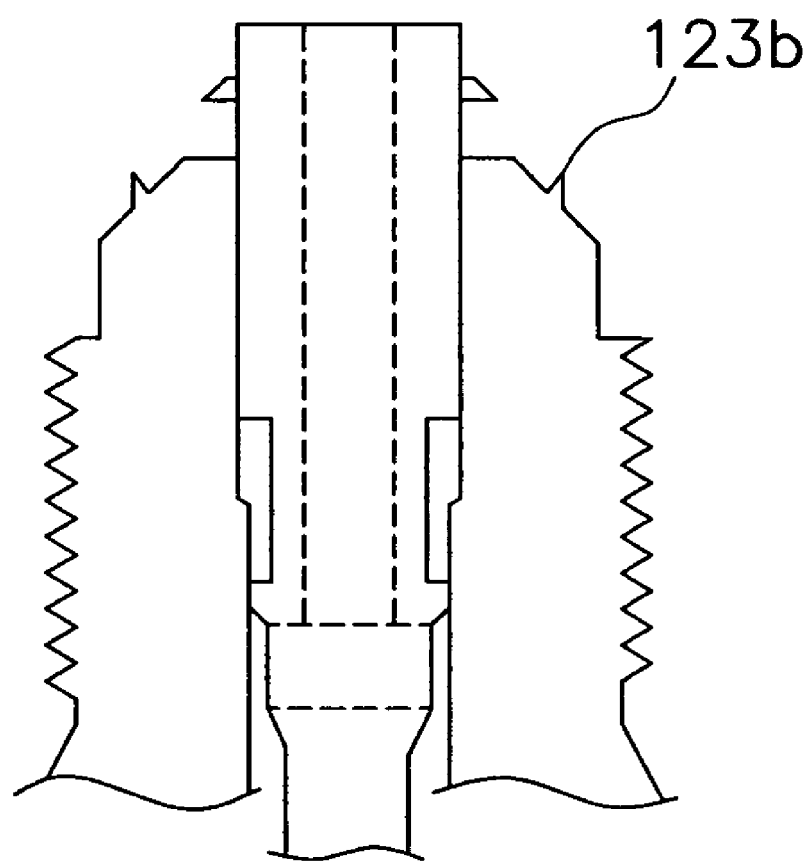
Figure 4F:
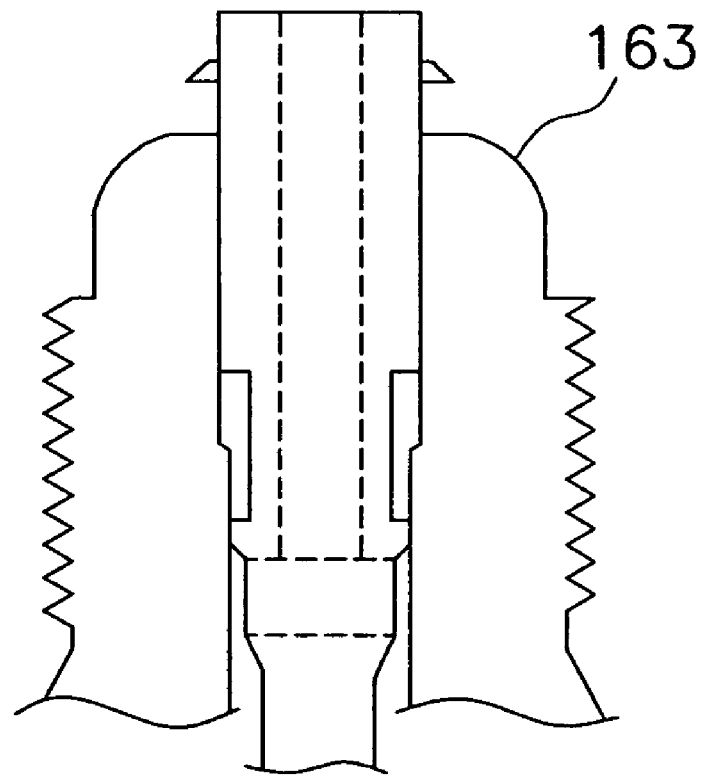
Figure 4G:
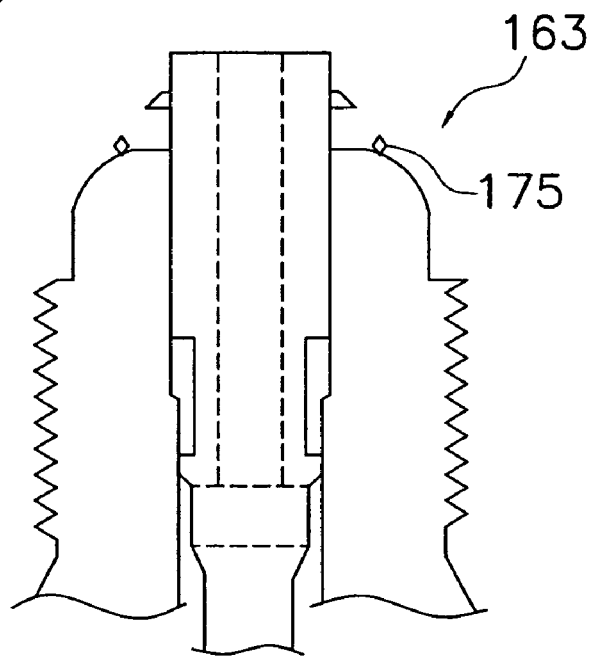
Figure 4H:
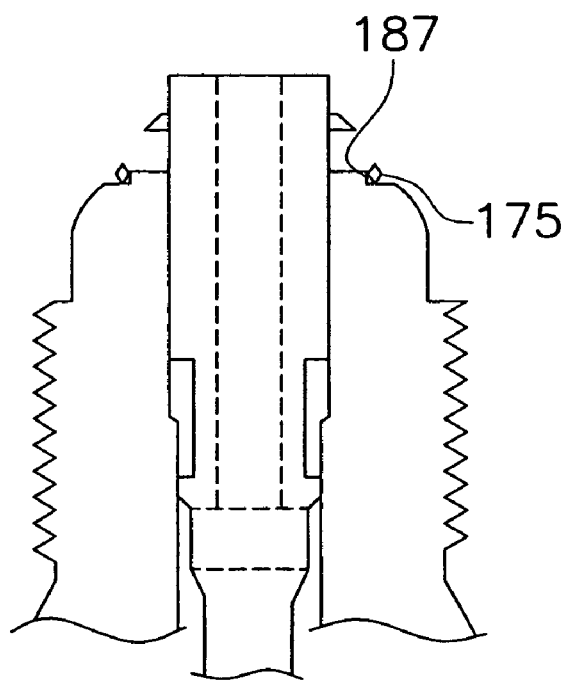

As a result, the passageway Pp of the pressure sensor connecting nut 20 and the first transit path Pi1 of the push rod 52 communicate, and the push rod storage space SPi and the second transit path Pi2 also communicate (refer to FIG. 2(b)). Furthermore, as the screwing together progresses, either the entire surface of the main body tapered part 53 contacts the entire surface of a nut tapered part 21, or the push rod protruding side X1 of the main body tapered part 53 in the push rod longitudinal direction X contacts the push rod protruding side X1 of the nut tapered part 21 in the push rod longitudinal direction.

Furthermore, in this state, the end part of the push rod 52 on the push rod protruding side X1 in the push rod longitudinal direction X and the flat surface part, which is formed on the pressure sensor connecting nut 20 on the opposite side X2 of the push rod protruding side of the passageway Pp in the push rod longitudinal direction X, are sufficiently sealed.

In addition, both the main body 51 and the pressure sensor connecting nut 20 are likewise sufficiently sealed by the main body tapered part 53 and the nut tapered part 21.

Connection Mode of Joint and Flared Copper Pipe Connecting Nut

Figure 1D:
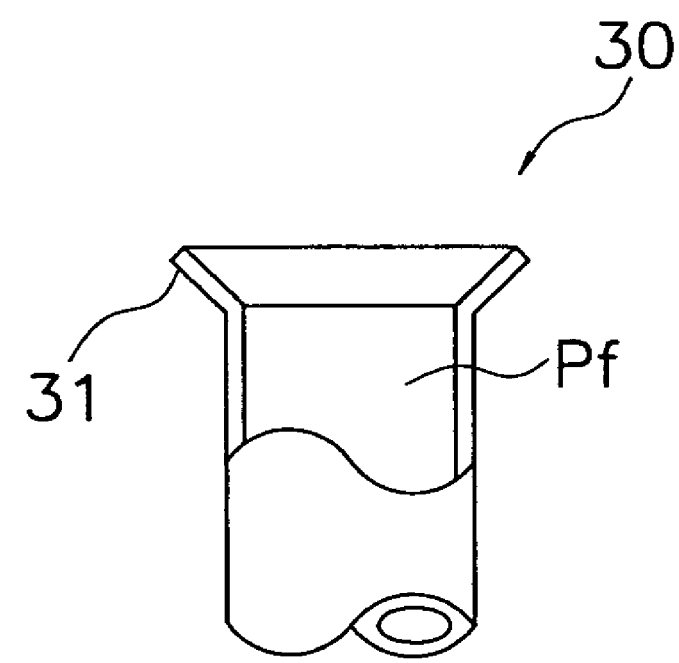
Figure 1E:
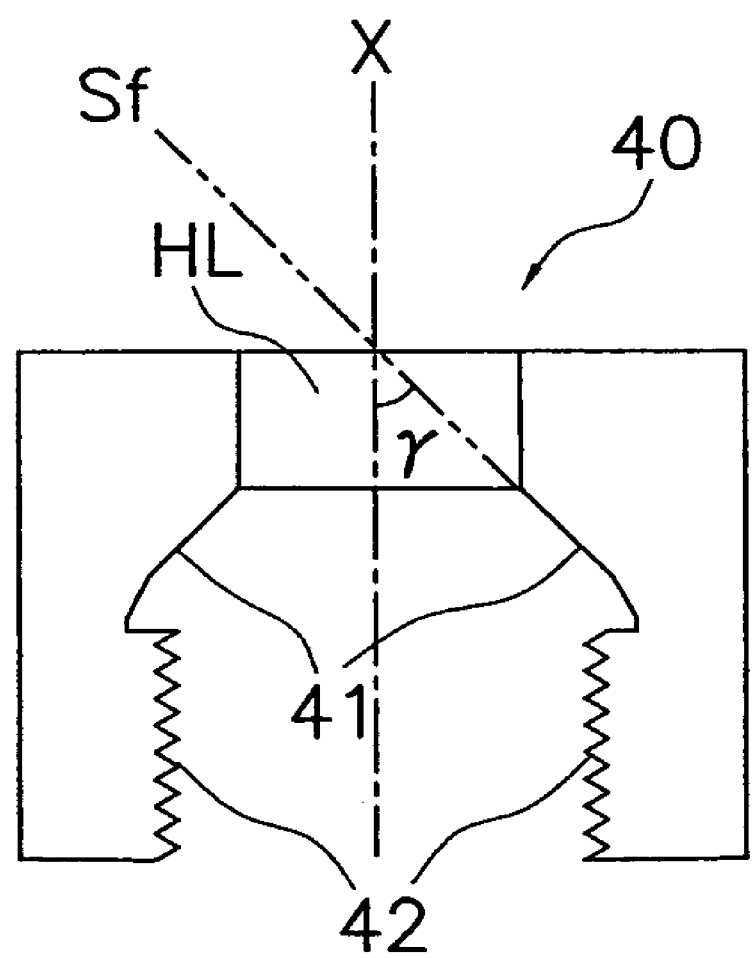
Figure 1F:
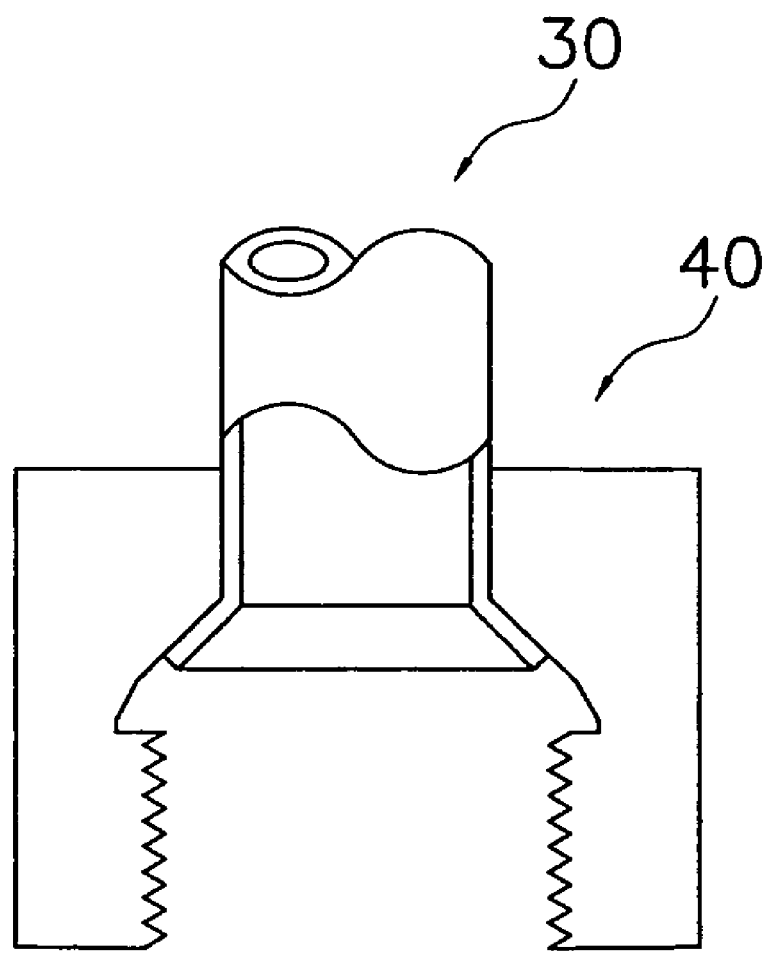
Figure 1G:
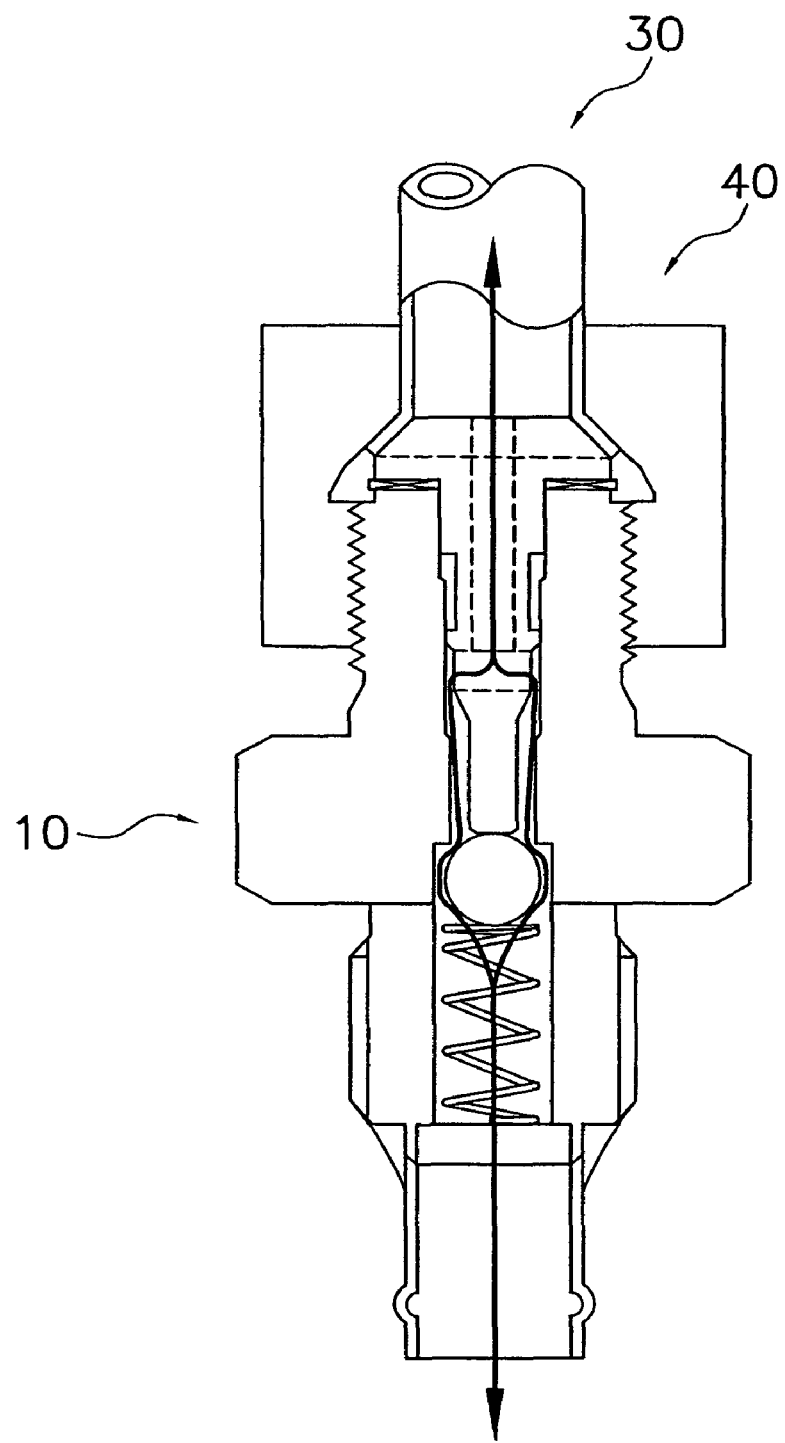

In addition, the joint 50 is capable, in cooperation with the flared copper pipe connecting nut 40 depicted in FIG. 1(e), of connecting the flared copper pipe 30, depicted in FIG. 1(d) with another copper piping (not shown). Furthermore, the joint 50 and another copper piping (not shown) are connected by braising, the same as in the case of the pressure sensor connecting nut 20. In addition, to connect the flared copper pipe 30 to the joint 50, the flared copper pipe 30 is inserted in advance into an opening HL of the flared copper pipe connecting nut 40 in a mode as depicted in FIG. 1(f). Furthermore, although a flared part 31 of the flared copper pipe 30 and the nut tapered part 41 of the flared copper pipe connecting nut 40 appear to be tightly sealed in FIG. 1(f), the flared part 31 of the flared copper pipe 30 and the nut tapered part 41 of the flared copper pipe connecting nut 40 are not necessarily tightly sealed in this state.

Furthermore, continuing with the screwing together of the male thread part 54 of the joint 50 and the female thread part 42 of the flared copper pipe connecting nut 40 along the push rod longitudinal direction X, the projection tapered part 52b of the push rod 52 first makes contact with the flared part 31 of the flared copper pipe 30, and then the push rod 52 and the steel ball 55 begin to move against the spring force of the spring 56 toward the opposite side X2 of the push rod protruding side in the push rod longitudinal direction X. As a result, a passageway Pf of the flared copper pipe 30 and the first transit path Pu of a push rod 52 communicate, and the push rod storage space SPi and the second transit path Pi2 also communicate (refer to FIG. 2(c)). Furthermore, as the screwing together progresses, the flared part 31 is interposingly pressed between the entire surface of the main body tapered part 53 and the entire surface of the nut tapered part 41, or between the push rod protruding side X1 of the main body tapered part 53 in the push rod longitudinal direction X and the push rod protruding side X1 of the nut tapered part 41 in the push rod longitudinal direction. Furthermore, in this state, the projection tapered part 52*b* and the flared part 31 are sufficiently sealed. In addition, the flared part 31 is likewise pressed interposingly between the main body 51 and the nut tapered part 41, sufficiently sealing the flared part 31, the main body 51, and the flared copper pipe connecting nut 40.

Features of the Joint (1)

With the joint 50 according to the present embodiment, the main body tapered part 53 contacts the nut tapered part 21 when the male thread part 54 and the female thread part 22 are screwed together. Consequently, with this joint 50, the main body 51 and the pressure sensor connecting nut 20 can be sealed by the main body tapered part 53 and the nut tapered part 21 without advancing the screwing together to the point where the copper gasket deforms, as in a conventional joint. Accordingly, with this joint 50, the main body 51 and the pressure sensor connecting nut 20 can be sealed with a low tightening torque. As a result, with this joint 50, cracking of the pressure sensor connecting nut 20 can be prevented. In addition, with this joint 50, the same as with a conventional joint, the end part of the push rod 52 on the push rod protruding side X1 contacts the flat surface part, which is formed on the pressure sensor connecting nut 20 on the opposite side X2 of the push rod protruding side of the passageway Pp in the push rod longitudinal direction X, and the push rod 52 moves toward the opposite side X2 of the push rod protruding side along the push rod longitudinal direction X. In addition, simultaneous thereto, the end part of the push rod 52 on the opposite side X2 of the push rod protruding side contacts the steel ball 55, which moves toward the opposite side X2 of the push rod protruding side. Consequently, even with this joint 50, the same as with a conventional joint, the fluid flowing to one fluid passageway can flow to another fluid passageway.

(2)

With the joint 50 according to the present embodiment, the main body tapered part 53 is formed so that the angle δ formed by the inclination direction Si1 of the main body tapered part 53 with the push rod longitudinal direction X is greater than or equal to a prescribed angle and is less than or equal to the angle β formed by the inclination direction Sp of the nut tapered part 21 with the push rod longitudinal direction X in a state wherein the female thread part 22 and the male thread part 54 are screwed together along the push rod longitudinal direction X.

Consequently, if female thread part 22 and the male thread part 54 are screwed together along the push rod longitudinal direction X, then the entire surface of the main body tapered part 53 can contact the entire surface of the nut tapered part 21, or the push rod protruding side X1 of the main body tapered part 53 in the push rod longitudinal direction X can contact the push rod protruding side X1 of the nut tapered part 21 in the push rod longitudinal direction X.

Accordingly, with this joint 50, a satisfactory seal state between the main body 51 and the pressure sensor connecting nut 20 can be achieved.

(3)

With the joint 50 according to the present embodiment, the flared part 31 is interposed and pressed by the main body tapered part 53 and the nut tapered part 41 when the female thread part 42 and the male thread part 54 are screwed together along the push rod longitudinal direction X in a state wherein the flared copper pipe 30 is inserted into the opening HL so that the flared part 31 contacts the nut tapered part 41.

Consequently, with this joint 50, the main body 51, the flared copper pipe 30, and the flared copper pipe connecting nut 40 can be sealed by the main body tapered part 53 and the nut tapered part 41 without advancing the screwing together to the point where the copper gasket deforms, as with a conventional joint. Accordingly, with this joint 50, the main body 51, the flared copper pipe 30, and the flared copper pipe connecting nut 40 can be sealed with a low tightening torque. As a result, with this joint 50, cracking of the flared copper pipe connecting nut 40 can be prevented. In addition, with this joint 50, the same as with a conventional joint, the end part of the push rod 52 on the push rod protruding side X1 contacts the flared part 31, and the push rod 52 moves toward the opposite side X2 of the push rod protruding side along the push rod longitudinal direction X. In addition, simultaneous thereto, the end part of the push rod 52 on the opposite side X2 of the push rod protruding side contacts the steel ball 55, which moves toward the opposite side X2 of the push rod protruding side. Consequently, even with this joint 50, the same as with a conventional joint, the fluid flowing to one fluid passageway can flow to another fluid passageway.

(4)

With the joint 50 according to the present embodiment, the main body tapered part 53 is formed so that the angle δ formed by the inclination direction Si1 of the main body tapered part 53 with the push rod longitudinal direction X is greater than or equal to a prescribed angle and is less than or equal to the angle γ formed by the inclination direction Sf of the nut tapered part 41 with the push rod longitudinal direction X in a state wherein the female thread part 42 and the male thread part 54 are screwed together along the push rod longitudinal direction X. Consequently, when the female thread part 42 and the male thread part 54 are screwed together along the push rod longitudinal direction X, the flared part 31 can be interposingly pressed between the entire surface of the main body tapered part 53 and the entire surface of the nut tapered part 41, or between the push rod protruding side X1 of the main body tapered part 53 in the push rod longitudinal direction X and the push rod protruding side X1 of the nut tapered part 41 in the push rod longitudinal direction X. Accordingly, with this joint 50, a satisfactory seal state can be achieved between the main body 51, the flared copper pipe 30, and the flared copper pipe connecting nut 40.

(5)

With the joint 50 according to the present embodiment, the push rod 52 comprises a projection part 52*a* at the portion protruding from the push rod storage space SPi.

Consequently, with this joint 50, as depicted in FIG. 2(*c*), even if the diameter of the push rod 52 is smaller than the diameter of the passageway of the flared copper pipe 30, the push rod 52 can contact the flared part 31 of the flared copper pipe 30. Accordingly, with this joint 50, even in a case as described above, the push rod 52 can move toward the opposite side X2 of the push rod protruding side in the push rod longitudinal direction X. As a result, with the joint 50, even in the case as described above, the fluid flowing to one fluid passageway can flow to another fluid passageway, the same as with the conventional joint. In addition, the projection part 52*a* comprises a projection tapered part 52*b*. Consequently, with this joint 50, a satisfactory seal state can be achieved between the nut member, the piping, and the like.

(6)

With the joint 50 according to the present embodiment, the projection tapered part 52*b* is formed so that the angle formed by the inclination direction of the projection tapered part 52*b* with the push rod longitudinal direction is greater than or equal to a prescribed angle and is less than or equal to the angle formed by the inclination direction of the flared part 31 of the flared copper pipe 30 with the push rod longitudinal direction X in a state wherein the female thread part 42 and the male thread part 54 are screwed together. Consequently, with this joint 50, a more satisfactory seal state can be achieved between the projection part 52*a* and the flared part 31.

MODIFIED EXAMPLES (A)

With the joint 50 according to the previous embodiments, the push rod 52 is adopted wherein the end surface on the push rod protruding side in the push rod longitudinal direction X is flat; however, a push rod 62 may be adopted, wherein a push rod tapered part 62*c* is provided at the end part of the push rod on the push rod protruding side in the push rod longitudinal direction X, as depicted in FIG. 3(*a*). With a joint 60 of this type, a satisfactory seal state can be achieved between the push rod 62, the pressure sensor connecting nut 70, the flared copper pipe 80, and the like (refer to FIG. 3(*c*) and FIG. 3(*e*)), even if the joint 60 is connected to a pressure sensor connecting nut 70 having a shape as depicted in FIG. 3(*b*), or to a flared copper pipe 80 having a small diameter as depicted in FIG. 3(*d*). In addition, a more satisfactory seal state can be achieved between the push rod 62, the pressure sensor connecting nut 70, the flared copper pipe 80, and the like, if the push rod tapered part 62*c* is formed so that the angle formed by the inclination direction of the push rod tapered part 62*c* along the push rod longitudinal direction X is greater than or equal to a prescribed angle and is less than or equal to the angle formed by the inclination direction of a nut tapered part 71 of the pressure sensor connecting nut 70 along the push rod longitudinal direction X or the inclination direction of a flared part 81 of the flared copper pipe 80 along the push rod longitudinal direction X in a state wherein the female thread parts 72 of the pressure sensor connecting nut 70 and the male thread part 64 are screwed together along the push rod longitudinal direction X, or the female thread part 92 of the flared copper pipe connecting nut 90 and the male thread part 64 are screwed together along the push rod longitudinal direction X.

(B)

With the joint 50 according to the previous embodiments, the main body tapered part 53 is formed so that the angle δ formed by the inclination direction Si1 of the main body tapered part 53 with the push rod longitudinal direction X is greater than or equal to a prescribed angle and is less than or equal to the angle β formed by the inclination direction Sp of the nut tapered part 21 with the push rod longitudinal direction X in a state wherein the female thread part 22 and the male thread part 54 are screwed together along the push rod longitudinal direction X. However, the main body tapered part 53 may be formed so that the angle δ formed by the inclination direction Si1 of the main body tapered part 53 with the push rod longitudinal direction X is greater than or equal to the angle β formed by the inclination direction Sp of the nut tapered part 21 with the push rod longitudinal direction X in a state wherein the female thread part 22 and the male thread part 54 are screwed together along the push rod longitudinal direction X.

(C)

With the joint 50 according to the previous embodiments, the main body tapered part 53 is formed so that the angle δ formed by the inclination direction Si1 of the main body tapered part 53 with the push rod longitudinal direction X is greater than or equal to a prescribed angle and is less than or equal to the angle g formed by the inclination direction Sf of the nut tapered part 41 with the push rod longitudinal direction X in a state wherein the female thread part 42 and the male thread part 54 are screwed together along the push rod longitudinal direction X. However, the main body tapered part 53 may be formed so that the angle δ formed by the inclination direction Si1 of the main body tapered part 53 with the push rod longitudinal direction X is greater than or equal to the angle g formed by the inclination direction Sf of the nut tapered part 41 with the push rod longitudinal direction X in a state wherein the female thread part 42 and the male thread part 54 are screwed together along the push rod longitudinal direction X.

(D)

With the joint 50 according to the previous embodiments, the seal structure of the main body tapered part 53, the nut tapered part 21, as well as the flared part 31 is formed by a tapered surface; however, a metal sealing 145 may be positioned between the main body tapered part 53 depicted in FIG. 4(*a*) and the nut tapered part 21 or the flared part 31, and the seal structure may be formed by this metal sealing 145. In addition, as depicted in FIG. 4(*b*), an O-ring 155 may be substituted for this metal sealing 145. In so doing, the metal sealing 145 can be arbitrarily replaced. Accordingly, the reliability of the seal can be improved when tightening is performed a number of times. Furthermore, as depicted in FIG. 4(*c*), a storage groove 147 for the metal sealing 145 or the O-ring 155 may be provided on the main body tapered part. In so doing, a satisfactory seal structure can be formed without the risk that the metal sealing 145 or the O-ring 155 will shift.

(E)

With the joint 50 according to the previous embodiments, nothing in particular was formed on the main body tapered part 53, but projection parts 123*a*, 123*b* may be further provided, as depicted in FIG. 4(*d*) and FIG. 4(*e*). In so doing, the seal structure of the main body tapered part and the nut tapered part 21 or the flared part 31 is formed by the projection parts 123*a*, 123*b*. Furthermore, with the projection part 123*a* depicted in FIG. 4(*d*), the surface on the outer circumferential side is a ring surface centered about the push rod longitudinal axis, and the surface on the inner circumferential side is substantially parallel to the surface orthogonal to the push rod longitudinal direction X. In addition, with the projection part 123*b* as depicted in FIG. 4(*e*), the surface on the outer circumferential side is a ring surface centered about the push rod longitudinal axis, and the surface on the inner circumferential side is an inverted conical surface (with respect to the push rod protruding side X1 direction) centered about the push rod longitudinal direction X.

(F)

With the joint 50 according to the previous embodiments, the main body is provided with a main body tapered part 53, but this main body tapered part 53 may also be a convex spherical surface part 163, as depicted in FIG. 4(*f*). In so doing, it becomes possible to form the seal structure by making line contact with any location on the nut tapered parts 21, 41, regardless of their respective angles. In addition, as depicted in FIG. 4(*g*), a metal sealing 175 or an O-ring 155 may be disposed on the convex spherical surface part 163 on the push rod protruding side X1. In addition, as depicted in FIG. 4(*h*), a storage groove 187 for the metal sealing 175 or the O-ring 155 may be provided on the convex spherical surface part on the push rod protruding side X1. In so doing, the seal structure is formed not only by the convex spherical surface part 163, but also by the metal sealing 175 or the O-ring 155. In other words, a dual seal structure can be formed.

(G)

With the joint according to the previous embodiments and the abovementioned modified examples, a tapered portion is provided at the push rod projection part, the end part of the push rod, and the like, but these may be convex spherical surfaces.

(H)

The previous embodiments explained modes wherein the joint 50 is connected to the pressure sensor connecting nut 20, the flared copper pipe 30, but this joint can also be adapted to a connection with a pressure switch, a safety valve, and the like.

INDUSTRIAL APPLICABILITY

The joint according to the present invention can prevent cracking of the nut part or the nut of the pressure sensor and is useful in constituting the refrigerant circuit of an air conditioner and the like.

What is claimed is:

1. A joint comprising:
a push rod having a protruding portion; and
a main body having
an upper end and a lower end spaced in a push rod longitudinal direction, said protruding portion of said push rod protruding along said push rod longitudinal direction from said upper end of said main body,
a push rod storage space being formed in said main body, said push rod storage space housing said push rod,
a communication path being formed in said main body at said lower end,
a seal structure forming part being formed on an outer circumference of said main body at said upper end, and
a male thread part being configured to thread together with a female thread part of a nut member along the push rod longitudinal direction,
said seal structure forming part surrounding said push rod storage space and being configured to form a seal structure by directly contacting a first tapered part of the nut member when said female thread part and said male thread part are threaded together,
a portion of said protruding portion being configured to contact a part of said nut member when installed, said push rod being movable toward said lower end of said main body along the push rod longitudinal direction to communicate with a fluid passageway of said nut member and said communication path.

2. The joint as recited in claim 1, wherein
said seal structure forming part is a second tapered part inclined toward a large diameter of said main body and toward said lower end in the push rod longitudinal direction.

3. The joint as recited in claim 2, wherein
an angle formed by an intersection of an inclination direction of said second tapered part with the push rod longitudinal direction is less than or equal to an angle formed by an inclination direction of the first tapered part of the nut member with the push rod longitudinal direction in a state in which said female thread part and said male thread part are threaded together.

4. The joint as recited in claim 2, wherein said second tapered part is provided with a taper projection part that projects toward the outer circumference, and said taper projection part is configured to form a seal structure by deforming when contacting said first tapered part of the nut member.

5. The joint as recited in claim 1, wherein
said seal structure forming part includes a convex spherical surface.

6. The joint as recited in claim 1, wherein
said seal structure forming part includes a sealing member as a separate body, and said sealing member is configured to form a seal structure by deforming when contacting said first tapered part.

7. The joint as recited in claim 6, wherein
said seal structure forming part further includes a groove that supports said sealing member.

8. The joint as recited in claim 1, wherein
said push rod includes a projection part at said protruding portion that projects toward the outer circumference, said projection part is configured to contact said first tapered part of the nut member.

9. The joint as recited in claim 8, wherein
said projection part includes a third tapered part inclined toward the outer circumference and toward said lower end in the push rod longitudinal direction, and
said third tapered part of said push rod is configured to contact said first tapered part of the nut member.

10. The joint as recited in claim 1, wherein
said push rod includes a fourth tapered part at an end part on said protruding portion that is inclined toward the outer circumference and toward said lower end in the push rod longitudinal direction, and
said fourth tapered part is configured to contact said first tapered part of the nut member.

11. A joint comprising:
a push rod having a protruding portion;
a main body having
an upper end and a lower end spaced in a push rod longitudinal direction, said protruding portion of said push rod protruding along said push rod longitudinal direction from said upper end of said main body,
a push rod storage space being formed in said main body, said push rod storage space housing said push rod,
a communication path being formed in said main body at said lower end,
a seal structure forming part being formed on an outer circumference of said main body at said upper end, and
a male thread part,
said seal structure forming part surrounding said push rod storage space and being configured to form a seal structure by directly contacting a first tapered part of a piping; and
a nut member including
a female thread part selectively threaded with said male thread part along the push rod longitudinal direction,
a second tapered part inclined toward an outer circumferential side and toward a female thread part side, and
an opening being formed in said nut member to insert the piping,
said seal structure forming part and said second tapered part being configured to sandwich and to press a portion of said first tapered part of the piping in a state in which said female thread part and said male thread part are screwed together and the piping is inserted in said opening of said nut member so that said first tapered part directly contacts said second tapered part, and said protruding portion directly contacts another portion of the first tapered part, said push rod being movable toward said lower end of said main body along the push rod longitudinal direction to communicate with a fluid passageway and said communication path.

12. The joint as recited in claim 11, wherein said seal structure forming part is a third tapered part inclined toward a large diameter of said main body and toward said lower end in the push rod longitudinal direction.

13. The joint as recited in claim 12, wherein an angle formed by an intersection of an inclination direction of said third tapered part with the push rod longitudinal direction is less than or equal to an angle formed by an inclination direction of the second tapered part with the push rod longitudinal direction in a state in which said female thread part and said male thread part are threaded together.

14. The joint as recited in claim 12, wherein said third tapered part is provided with a taper projection part that projects toward the outer circumference, and said taper projection part is configured to form a seal structure by contacting said first tapered part of the piping.

15. The joint as recited in claim 11, wherein said seal structure forming part includes a convex spherical surface.

16. The joint as recited in claim 11, wherein said seal structure forming part includes a sealing member as a separate body, and said sealing member is configured to form a seal structure by deforming when contacting said first tapered part.

17. The joint as recited in claim 16, wherein said seal structure forming part further includes a groove for supporting said sealing member.

18. The joint as recited in claim 11, wherein said push rod includes a projection part that projects toward the outer circumference at said protruding portion, said projection part is configured to contact said first tapered part of the piping.

19. The joint as recited in claim 18, wherein said projection part includes an fourth tapered part inclined toward the outer circumference and toward said lower end in the push rod longitudinal direction, and said fourth tapered part of said push rod is configured to contact said first tapered part of the piping.

20. The joint as recited in claim 11, wherein said push rod includes a fifth tapered part at an end part on said protruding portion that is inclined toward the outer circumference and toward said lower end in the push rod longitudinal direction, and said fifth tapered part is configured to contact said first tapered part of the piping.

* * * * *